US011671886B2

(12) United States Patent
Moosavi et al.

(10) Patent No.: US 11,671,886 B2
(45) Date of Patent: Jun. 6, 2023

(54) MEASUREMENT CONFIGURATION FOR UNLICENSED OPERATIONS

(71) Applicant: Telefonaktiebolaget LM Ericsson (publ), Stockholm (SE)

(72) Inventors: Reza Moosavi, Linköping (SE); Marco Belleschi, Solna (SE); Mattias Bergström, Sollentuna (SE); Peter Alriksson, Hörby (SE); Robert Karlsson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/053,563

(22) PCT Filed: May 17, 2019

(86) PCT No.: PCT/IB2019/054108
§ 371 (c)(1),
(2) Date: Nov. 6, 2020

(87) PCT Pub. No.: WO2019/224674
PCT Pub. Date: Nov. 28, 2019

(65) Prior Publication Data
US 2021/0235340 A1 Jul. 29, 2021

Related U.S. Application Data

(60) Provisional application No. 62/674,382, filed on May 21, 2018.

(51) Int. Cl.
*H04W 36/00* (2009.01)
*H04W 24/08* (2009.01)
(Continued)

(52) U.S. Cl.
CPC ....... *H04W 36/0094* (2013.01); *H04W 24/08* (2013.01); *H04W 74/0808* (2013.01); *H04W 16/14* (2013.01)

(58) Field of Classification Search
CPC ......... H04W 36/0094; H04W 36/0088; H04W 24/08; H04W 74/0808; H04W 16/14
See application file for complete search history.

(56) References Cited

U.S. PATENT DOCUMENTS 10,440,643 B2 * 10/2019 Feng ................... H04B 17/309
2016/0014664 A1 * 1/2016 Singh ....................... H04L 5/00
370/332

(Continued)

FOREIGN PATENT DOCUMENTS

| WO | 2016077701 A1 | 5/2016 |
| WO | 2018132051 A1 | 7/2018 |
| WO | 2019098910 A1 | 5/2019 |

OTHER PUBLICATIONS

"Mobility for NR-U", 3GPP RAN WG2 Meeting #103; R2-1811455; Gothenburg, Sweden, Aug. 20-24, 2018, pp. 1-5.
(Continued)

*Primary Examiner* — Hassan Kizou
*Assistant Examiner* — Hector Reyes
(74) *Attorney, Agent, or Firm* — Sage Patent Group

(57) ABSTRACT

Embodiments include methods for a user equipment to perform measurements on a plurality of target cells in a radio access network. Embodiments include receiving a measurement configuration relating to one or more radio resource operations and comprising first and second sets of conditions related to respective first and second target cells; and performing measurements of radio signals associated with the first target cell and/or the second target cell. Embodiments also include performing a radio resource operation toward the first target cell, based on a first determination that the
(Continued)

measurements of the radio signals associated with the first target cell fulfill at least one condition of the first set. Embodiments also include performing the radio resource operation toward the second target cell, based on a second determination that the measurements of the radio signals associated with the second target cell fulfill at least one condition of the second set.

19 Claims, 11 Drawing Sheets

(51) Int. Cl.
*H04W 74/08* (2009.01)
*H04W 16/14* (2009.01)

(56) References Cited

U.S. PATENT DOCUMENTS

| | | | |
|---|---|---|---|
| 2016/0227416 A1* | 8/2016 | Suzuki | H04W 72/0453 |
| 2016/0262118 A1 | 9/2016 | Kim et al. | |
| 2018/0176710 A1* | 6/2018 | Jang | H04W 88/10 |
| 2018/0176961 A1* | 6/2018 | Babaei | H04W 74/0833 |
| 2018/0192340 A1* | 7/2018 | Karimli | H04W 36/30 |
| 2018/0255486 A1* | 9/2018 | Kumar | H04L 45/125 |
| 2018/0324797 A1* | 11/2018 | Hosseini | H04W 72/042 |
| 2020/0252846 A1* | 8/2020 | Ozturk | H04W 74/0808 |
| 2020/0260310 A1* | 8/2020 | Kim | H04W 4/40 |
| 2020/0351940 A1* | 11/2020 | Deogun | H04W 16/14 |

OTHER PUBLICATIONS

"Mobility Framework in NR-U", 3GPP TSG-RAN WG2 NR#101-Bis; Tdoc R2-1805732; Sanya, China, Apr. 16-20, 2018, pp. 1-4.

"3GPP TS 38 331 V15.1.0"; 3rd Generation Partnership Project; Technical Specification Group Radio Access Network; NR; Radio Resource Control (RRC) protocol specification (Release 15), Mar. 2018, pp. 1-268.

"3GPP TR 38.801 V1.2.0"; 3rd Generation Partnership Project; Technical Specification Group Radio Access Network; Study on New Radio Access Technology; Radio Access Architecture and Interfaces (Release 14), Feb. 2017, pp. 1-90.

\* cited by examiner

```
┌─────────────────────────────────────────────────────────────────────┐
│ Receiving a measurement configuration relating to one or more       │
│ radio-resource operations involving a plurality of target cells,    │ 710
│ the configuration comprising:                                       │
│ a first set of conditions relating to a first target cell; and      │
│ a second set of conditions relating to a second target cell.        │
└─────────────────────────────────────────────────────────────────────┘
                                   │
                                   ▼
┌─────────────────────────────────────────────────────────────────────┐
│ Performing measurements of radio signals associated with at least   │ 720
│ one of the first target cell and the second target cell.            │
│ ┌─────────────────────────────────────────────────────────────────┐ │
│ │ Prioritizing measurements of radio signals associated with the  │ │ 721
│ │ first group relative to measurements of radio signals           │ │
│ │ associated with the second group.                               │ │
│ ├─────────────────────────────────────────────────────────────────┤ │
│ │ Determining, based on the measurement results, respective       │ │ 722
│ │ congestion metrics associated with the at least one of the      │ │
│ │ first and second target cells.                                  │ │
│ ├─────────────────────────────────────────────────────────────────┤ │
│ │ Determining, based on the measurement results, respective       │ │ 723
│ │ quality metrics associated with the at least one of the first   │ │
│ │ and second target cells.                                        │ │
│ └─────────────────────────────────────────────────────────────────┘ │
└─────────────────────────────────────────────────────────────────────┘
                                   │
                                   ▼
┌─────────────────────────────────────────────────────────────────────┐
│ Performing a radio-resource operation with respect to the first     │
│ target cell, based on a first determination that the measurements   │ 730
│ of the radio signals associated with the first target cell fulfill  │
│ at least one condition of the first set.                            │
│ ┌─────────────────────────────────────────────────────────────────┐ │
│ │ Prioritizing the radio resource operation for the first target  │ │ 731
│ │ cell by performing the radio resource operation based on the    │ │
│ │ first determination, without performing measurements            │ │
│ │ associated with the second target cell.                         │ │
│ ├─────────────────────────────────────────────────────────────────┤ │
│ │ Prioritizing the radio resource operation for the first target  │ │ 732
│ │ cell, based on performing the first determination before a      │ │
│ │ second determination associated with the second target cell.    │ │
│ ├─────────────────────────────────────────────────────────────────┤ │
│ │ Performing the radio-resource operation with respect to the     │ │ 733
│ │ first target cell if the one or more measurements fulfill all   │ │
│ │ conditions of the first set.                                    │ │
│ ├─────────────────────────────────────────────────────────────────┤ │
│ │ Performing a first radio resource operation based on a first    │ │ 734
│ │ determination that the measurements of the radio signals        │ │
│ │ associated with the first target cell fulfill at least one      │ │
│ │ condition of a particular first subset.                         │ │
│ ├─────────────────────────────────────────────────────────────────┤ │
│ │ Performing a second radio resource operation based on a first   │ │ 735
│ │ determination that the measurements of the radio signals        │ │
│ │ associated with the first target cell fulfill at least one      │ │
│ │ condition of a further first subset                             │ │
│ └─────────────────────────────────────────────────────────────────┘ │
└─────────────────────────────────────────────────────────────────────┘
                                   │
                                   ▼
┌─────────────────────────────────────────────────────────────────────┐
│ Performing the radio-resource operation with respect to the second  │
│ target cell, based on a second determination that the measurements  │ 740
│ of the radio signals associated with the second target cell fulfill │
│ at least one condition of the second set.                           │
└─────────────────────────────────────────────────────────────────────┘
```

*FIG. 7*

MEASUREMENT CONFIGURATION FOR UNLICENSED OPERATIONS

TECHNICAL FIELD

The present application relates generally to the field of wireless communications, and more specifically to devices, methods, and computer-readable media that improve mobility operations by a wireless device or user equipment (UE) operating in a wireless communication network, particularly in networks that utilized unlicensed spectrum.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, operation, etc. are to be interpreted openly as referring to at least one instance of the element, apparatus, component, means, operation, etc., unless explicitly stated otherwise. The operations of any methods disclosed herein do not have to be performed in the exact order disclosed, unless an operation is explicitly described as following or preceding another operation and/or where it is implicit that an operation must follow or precede another operation. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Mobile data traffic is growing exponentially due to the enormous success of smart phones, tablets and other data traffic appliances. The traditional way for increasing the data rate had been to increase the transmission bandwidth. However, the spectrum has become scarce due to the increase in wireless access systems and hence the main challenge for the future wireless access systems is to find alternative solutions to meet high demands on the data rate. One way of handling the increased wireless data traffic is to deploy more base stations (BS) and densify the cellular network. This would however increase interference and deployment cost. Another option for increasing the system capacity is to introduce large antenna arrays (e.g., arrays of antenna elements) at the BS. Using these arrays, the BS can create multiple coverage beams—sometimes referred to as "beamforming"—with each beam targeted to a particular user or subset of users within the BS's entire coverage area. In this manner, the BS can spatially multiplex more users within a given frequency bandwidth in the coverage area, thereby increasing system capacity. This technique is often referred to as very large (VL) multi-user (MU) multiple-input-multiple-output (MIMO), and is abbreviated by VL-MIMO hereinafter.

Such beamforming and spatial multiplexing techniques can be utilized in Long-Term Evolution (LTE) cellular networks. LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., network node to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to network node) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the network node in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

Furthermore, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

The LTE FDD uplink (UL) radio frame is configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the PHY resources. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for network node DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, RRC is used to configure/setup and maintain the radio connection between the UE and the network node. When the UE receives an RRC message from the network node, it will apply the configuration, and if this succeeds the UE generates an RRC complete message that indicates the transaction ID of the message that triggered this response.

Since LTE-release 8, three Signaling Radio Bearers (SRBs), namely SRB0, SRB1 and SRB2 have been available for the transport of RRC and Non-Access Stratum (NAS) messages between the UE and network node. A new SRB, known as SRB1bis, was also introduced in rel-13 for supporting DoNAS (Data Over NAS) in NB-IoT. SRB0 is for RRC messages using the CCCH logical channel, and it is used for handling RRC connection setup, RRC connection resume and RRC connection re-establishment. Once the UE is connected to the network node (i.e., RRC connection setup or RRC connection reestablishment/resume has succeeded), SRB1 is used for handling RRC messages (which may include a piggybacked NAS message) as well as for NAS messages prior to the establishment of SRB2, all using DCCH logical channel. On the other hand, SRB2 is used for RRC messages which include logged measurement information as well as for NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

To support mobility (e.g., handover or reselection) between cells and/or beams, a UE can perform periodic cell search and measurements of signal power and quality (e.g., reference signal received power, RSRP, and Reference signal received quality, RSRQ) in both Connected and Idle modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN reference signals, UE-specific Reference Signal (DM-RS) associated with PDSCH, Demodulation Reference Signal (DM-RS) associated with EPDCCH or MPDCCH, Positioning Reference Signal (PRS), and CSI Reference Signal (CSI-RS).

UE measurement reports to the network can be configured to be periodic or aperiodic based a particular event. For example, the network can configure a UE to perform measurements on various carrier frequencies and various RATs corresponding to neighbor cells, as well as for various purposes including, e.g., mobility and positioning. The configuration for each of these measurements is referred to as a "measurement object." Furthermore, the UE can be configured to perform the measurements according to a "measurement gap pattern" (or "gap pattern" for short), which can comprise a measurement gap repetition period (MGRP) (i.e., how often a regular gap available for measurements occurs) and a measurement gap length (MGL) (i.e., the length of each recurring gap).

In LTE, the concept of Time-To-Trigger (TTT) is used to ensure that the event triggering criterion is satisfied for a long enough duration before a measurement report is sent by the UE. The triggering criterion and TTT are configured in a reportConfig message (or information element, IE) sent by the network to the UE. The value of TTT provided in reportConfig is applicable to all neighbor cells of the UE that could trigger a measurement report based on the specified triggering criterion.

Another enhancement added to LTE rel-13 is licensed-assisted access (LAA), which enables operation in the unlicensed spectrum to meet ever-increasing traffic growth. LAA adheres to the requirements of the listen before talk (LBT) protocol, which is mandated in Europe and Japan. Rel-13 defines LAA only for the downlink (DL). One feature introduced in Rel-14 is enhanced-Licensed Assisted Access (eLAA), which includes uplink (UL) operation for LAA. The technology is further developed in Rel-15 as further enhanced LAA (feLAA).

When operating in unlicensed spectrum, it is important to minimize always-on transmissions and to concentrate them in time as much as possible. Minimizing always-on transmissions reduces interference both within a network and towards other networks.

Concentrating transmissions in time instead of spreading them out has the benefit that the number of times a node needs to contend for the medium is minimized. These goals resulted in the introduction of Discovery Reference Signal (DRS) in Rel-13 LAA.

In LTE Rel-12, discovery reference signals (DRS) were introduced to facilitate fast transition of small cells from OFF state to ON state by transmitting low duty cycle signals for radio resource measurement during OFF state. These DRS—including synchronization signals and reference signals—are transmitted to allow UEs to discover and measure the dormant cell. Rel-13 LAA DRS is the same as the first twelve OFDM symbols of the Rel-12 DRS in Frame Structure Type 15 (i.e., a frame structure defined for frequency division duplexing, FDD). DRS can be transmitted within a periodically occurring time window called DRS measurement timing configuration (DMTC) occasion, which has a duration of 6 ms and a configurable period of 40, 80, or 160 ms. The transmission of DRS is also subject to LBT.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Even so, there are several reasons why UE mobility in NR networks is more difficult than in LTE networks. For example, NR downlink signals available for UE measurement can occur much more sparsely, or over a longer time period, than in LTE. In addition, NR mobility problems and/or issues can be exacerbated by operation in unlicensed spectrum (referred to as "NR-U"). This can be due, for example, to the transmissions both from the gNB and UE being blocked and/or delayed by the listen-before-talk (LBT) procedure.

As such, the same motivations—minimizing and concentrating transmissions—that led to the introduction of a DRS in Rel-13 LAA is also applicable to NR-U and, as such, may lead to an introduction of DRS in NR-U. Even though particular structures of "DRS-like" signals is yet to be determined by 3GPP RAN1 WG, and could differ from LTE DRS, the concentration of the transmissions provides fewer opportunities for the UE to make resource measurements in NR-U. This can result in delays in measuring and reporting critical information, such that various RRC measurement reports and commands/requests—handover command, handover complete, etc.—may be delayed and/or dropped, leading to handover failure.

SUMMARY

Exemplary embodiments disclosed herein address these problems, issues, and/or drawbacks of existing solutions by providing a flexible but efficient approach for configuring a UE to measure different parameters in different cells. Various type of parameters and configuration criteria are described hereinbelow. These exemplary embodiments provide improvements to the operation of UEs in a cellular network, particularly in relation to operation in unlicensed bands. These improvements include, but are not limited to, reducing unnecessary signaling between the UE and network; reducing power consumption of the UE and network, particularly for low-power machine-type UEs; improving UE mobility by reducing failed handover attempts; and freeing up scarce UE and network resources to handle other important tasks, such as transmission/reception of user data.

Exemplary embodiments of the present disclosure include methods (e.g., procedures) for a user equipment (UE), operating in a serving cell in a radio access network (RAN), to perform measurements on a plurality of target cells in the RAN. The exemplary methods can include receiving a measurement configuration relating to one or more radio resource operations. The measurement configuration can include a first set of conditions relating to a first target cell of the target cells, and a second set of conditions relating to a second target cell of the target cells. In some embodiments, the one or more radio-resource operations can include at least one of the following: measurement reporting, handover, conditional handover, and cell or beam reselection.

The exemplary methods can also include performing measurements of radio signals associated with at least one of the first target cell and the second target cell. In some embodiments, the radio signals from the first target cell can be received in a licensed band and the radio signals from the second target cell are received in an unlicensed band, or vice versa. The exemplary methods can also include performing a radio-resource operation with respect to the first target cell, based on a first determination that the measurements of the radio signals associated with the first target cell fulfill at least one condition of the first set. The exemplary methods can also include performing the radio-resource operation with respect to the second target cell, based on a second determination that the measurements of the radio signals associated with the second target cell fulfill at least one condition of the second set.

Other exemplary embodiments include methods (e.g., procedures) for configuring a user equipment (UE), operating in a serving cell in a radio access network (RAN), to perform measurements on a plurality of target cells in the RAN. The exemplary methods can be performed by one or more of the network nodes in the RAN (e.g., base station, eNB, gNB, etc.). The exemplary methods can include sending, to the UE, a measurement configuration relating to one or more radio resource operations. The measurement configuration can include a first set of conditions relating to a first target cell of the target cells, and a second set of conditions relating to a second target cell of the target cells. In some embodiments, the one or more radio-resource operations can include at least one of the following: measurement reporting, handover, conditional handover, and cell or beam reselection. In some embodiments, the first target cell can operate in a licensed band and the second target cell can operate in an unlicensed band, or vice versa.

The exemplary methods can also include receiving a message from the UE with respect to one of the radio-resource operations. The message can be based on one of the following: a first determination that measurements of radio signals associated with the first target cell fulfill at least one condition of the first set; and a second determination that measurements of radio signals associated with the second target cell fulfill at least one condition of the second set.

Other exemplary embodiments include UEs or network nodes configured to perform operations corresponding to any of the exemplary methods described herein. Other exemplary embodiments include non-transitory, computer-readable media storing program instructions that, when executed by at least one processor, configure a UE or a network node to perform operations corresponding to any of the exemplary methods described herein.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 7 is a flow diagram illustrating exemplary methods performed by a wireless device and/or UE according to various exemplary embodiments of the present disclosure.

DETAILED DESCRIPTION

Figure 1:
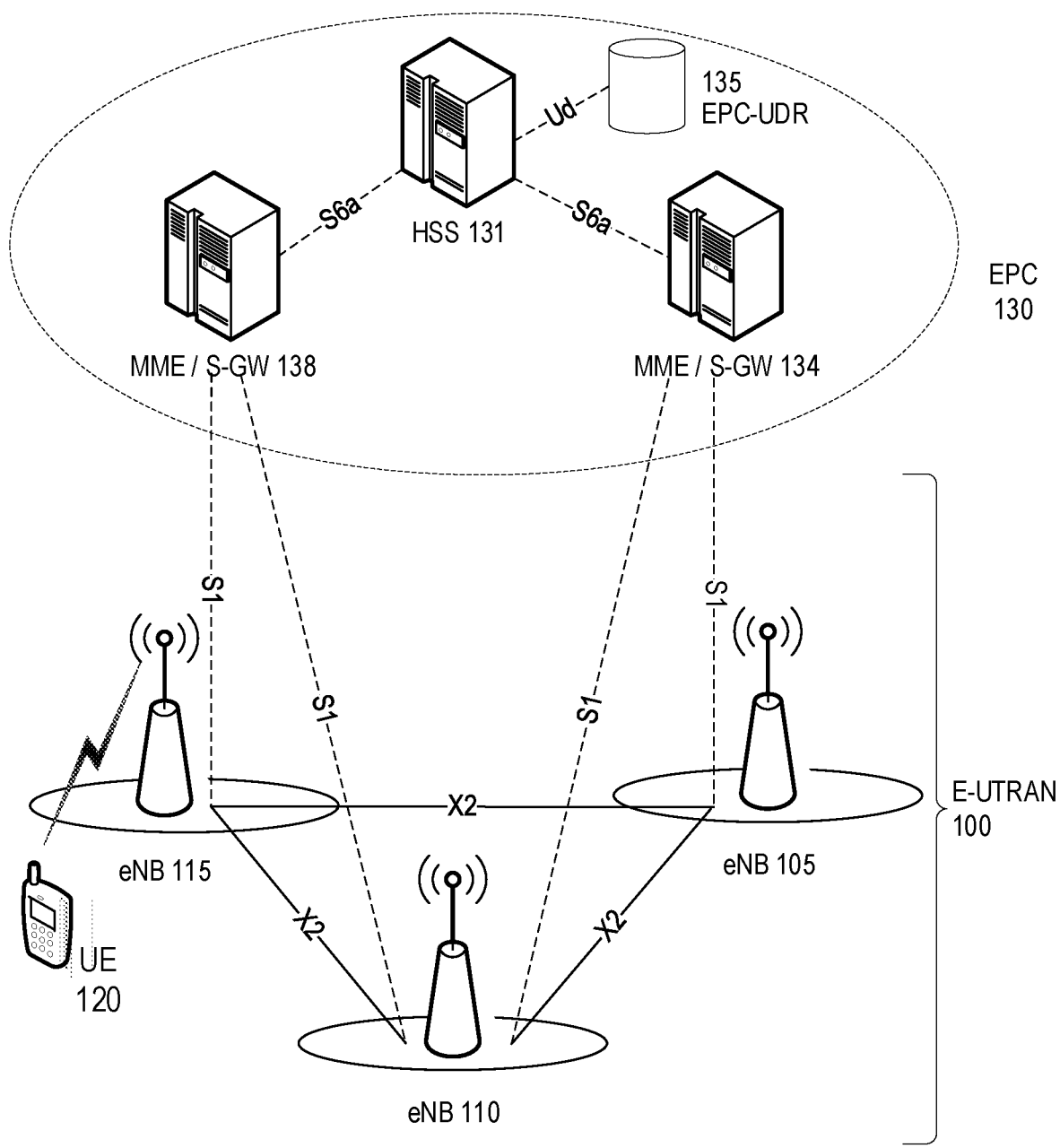
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
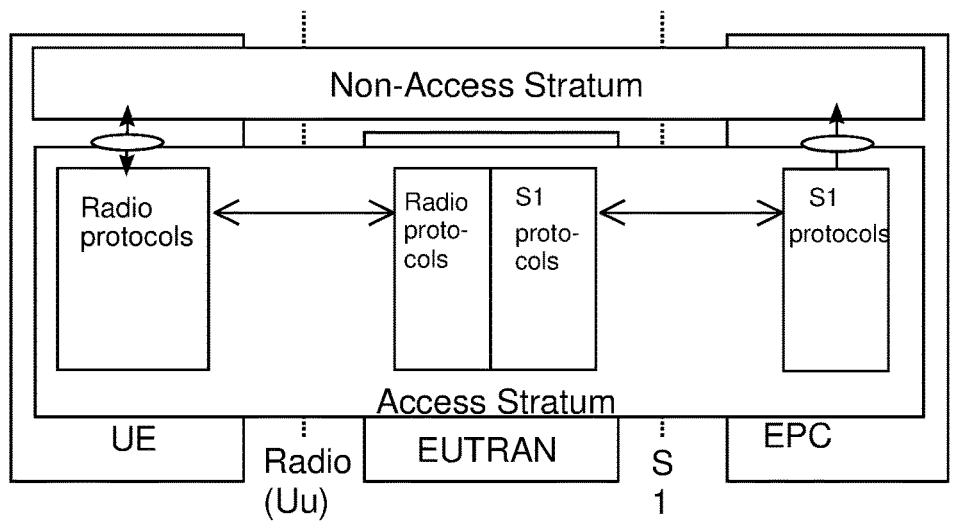
FIG. 2A is a high-level block diagram of an exemplary E-UTRAN architecture in terms of its constituent components, protocols, and interfaces.
Figure 2B:
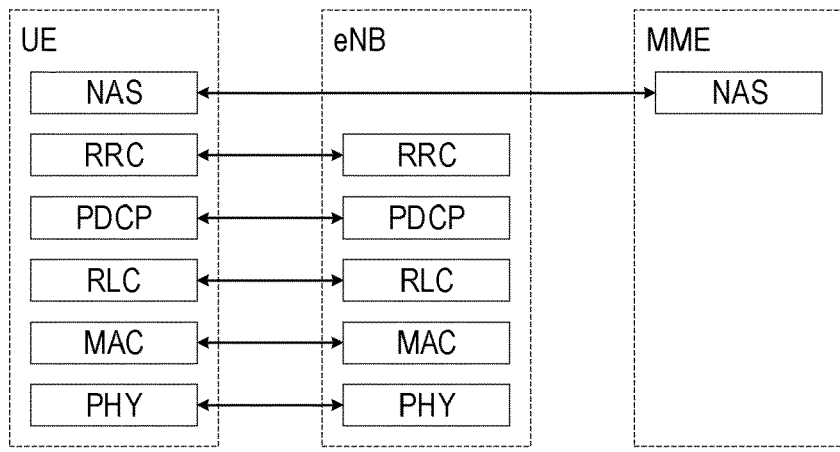
FIG. 2B is a block diagram of exemplary protocol layers of the control-plane portion of the radio (Uu) interface between a user equipment (UE) and the E-UTRAN.
Figure 2C:
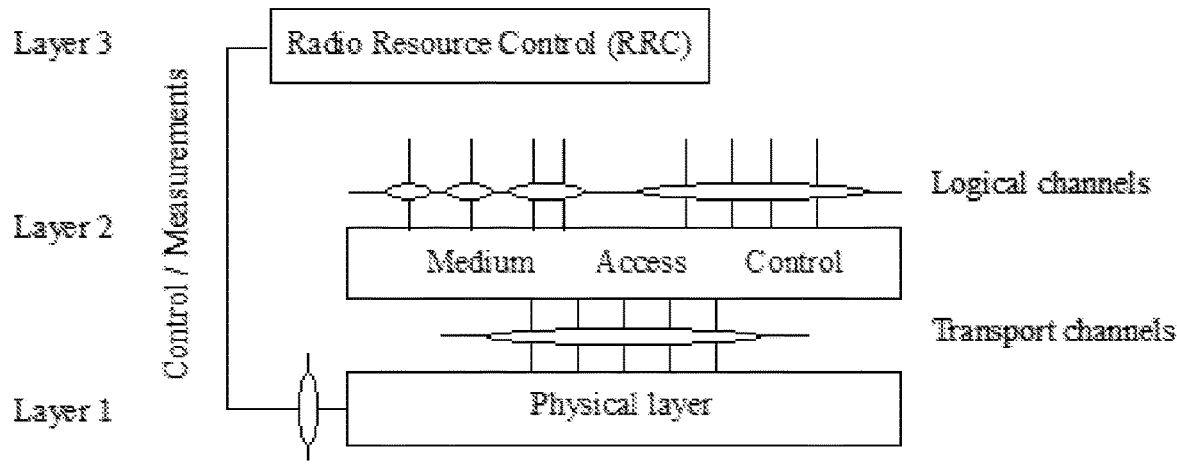
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (network node) in a 3GPP LTE network), a high-power or macro base station, a low-power base station (e.g., a micro base station, a pico base station, a home network node, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR concepts) beams may be used instead of cells and, as such, concepts described herein apply equally to both cells and beams.

As briefly mentioned above, there are several reasons why UE mobility in NR networks is more difficult than in LTE networks. For example, NR downlink signals available for UE measurement can occur much more sparsely, or over a longer time period, than in LTE. In addition, NR mobility problems and/or issues can be exacerbated by operation in unlicensed spectrum (referred to as "NR-U"). This can be due, for example, to the transmissions both from the gNB and UE being blocked and/or delayed by the listen-before-talk (LBT) procedure. These issues are discussed in more detail below.

Figure 3:
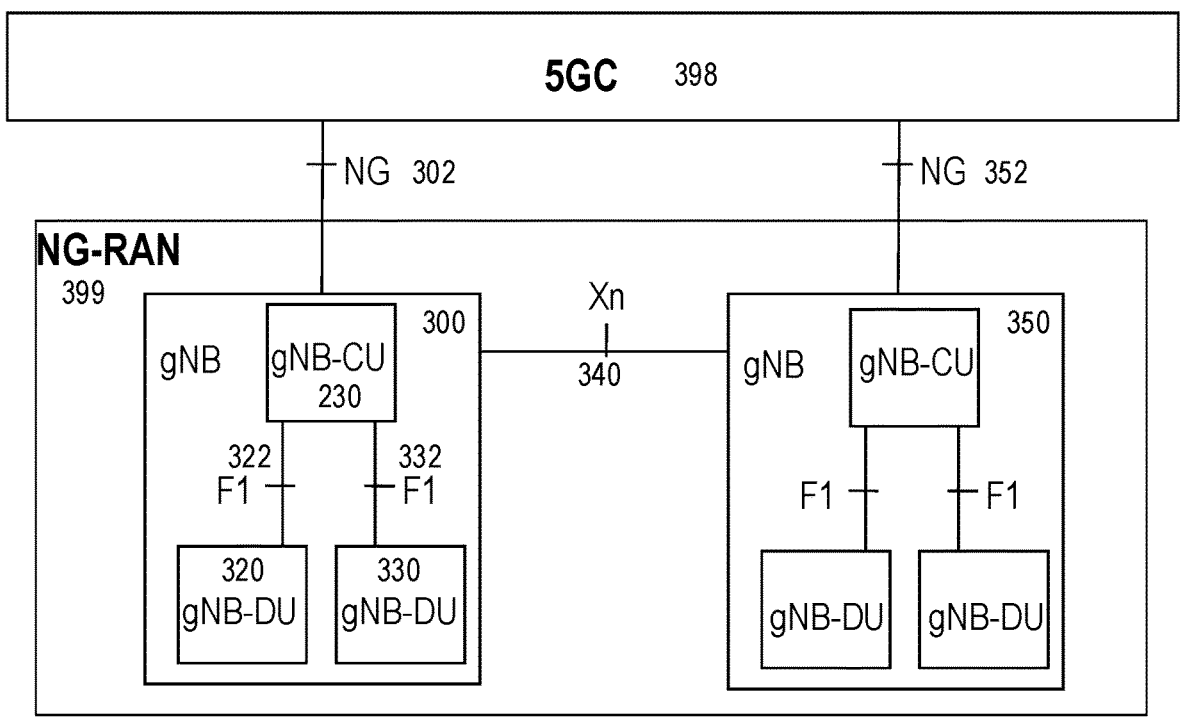
FIG. 3 is a block diagram of an exemplary 5G/NR logical network architecture.

FIG. 3 illustrates a high-level view of the 5G network architecture, consisting of a Next Generation RAN (NG-RAN) 399 and a 5G Core (5GC) 398. NG-RAN 399 can include one or more gNodeB's (gNBs) connected to the 5GC via one or more NG interfaces, such as gNBs 300, 350 connected via interfaces 302, 352, respectively. More specifically, gNBs 300, 350 can be connected to one or more Access and Mobility Management Functions (AMF) in the 5GC 398 via respective NG-C interfaces. Similarly, gNBs 300, 350 can be connected to one or more User Plane Functions (UPFs) in 5GC 398 via respective NG-U interfaces.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMEs) in EPC via respective S1-C interfaces. Similarly, gNBs 300, 350 can connect to one or more Serving Gateways (SGWs) in EPC via respective S1-U interfaces.

In addition, the gNBs can be connected to each other via one or more Xn interfaces, such as Xn interface 340 between gNBs 300 and 350. The radio technology for the NG-RAN is often referred to as "New Radio" (NR). With respect the the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 3 (and described further in TS 38.401 and TR 38.801) include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthemore, the F1 interface between the gNB-CU and gNB-DU is specified and/or based on the following general principles:

F1 is an open interface;

F1 supports the exchange of signalling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-quipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface.

Furthermore, multi-RAT (radio access technology) dual connectivity (MR-DC) can also be envisioned as an important feature in 5G RAN architectures to deliver enhanced end-user bit rate. One such MR-DC arrangement is commonly referred to as E-UTRAN-NR Dual Connectivity (or EN-DC for short) and identified in 3GPP TR 38.801 as "option 3." In EN-DC, a node providing E-UTRA resources (e.g., LTE network node) acts as master node (MN, i.e., anchors the UE control-plane connection) and an NR node (e.g., gNB) acts as secondary node (SN) providing additional UP resources.

Another important goal of NR is to provide more capacity for operators to serve ever increasing traffic demands and variety of applications. Because of this, NR will be able to operate on high frequencies like frequencies over 6 GHz until 60 or even 100 GHz. In comparison to the current frequency bands allocated to LTE, some of the new bands will have much more challenging propagation properties such as lower diffraction and higher outdoor/indoor penetration losses. Consequently, signals will have less ability to propagate around corners and penetrate walls. In addition, in high frequency bands atmospheric/rain attenuation and higher body losses render the coverage of NR signals even more spotty. Fortunately, the operation in higher frequencies also makes it possible to use smaller antenna elements, which enables antenna arrays with many antenna elements. As such, beamforming may play an even greater role in NR than in LTE.

Figure 4:
FIGS. 4A-4C show exemplary time-frequency configurations of NR SS/PBCH blocks (SSBs) usable with one or more exemplary embodiments of the present disclosure.

In NR, downlink signals available for UE measurement can occur much more sparsely, or over a longer time period, than in LTE. An exemplary configuration for an NR synchronization signal and PBCH block (SSB) is illustrated in FIG. 4A. The NR SSB comprises a Primary Synchronization Signal (PSS), a Secondary Synchronization Signal (SSS), a Physical Broadcast Channel (PBCH), and Demodulation Reference Symbols (DM-RS). As also shown in FIG. 4A, an individual SSB spans four adjacent OFDM symbols within a PRB. Multiple SSBs comprise an SSB burst, which is transmitted within a half-frame (e.g., 5 ms). Moreover, within the half-frame, multiple SSBs for different cells or different beams may be transmitted, as illustrated with SSB indices 0-7 in FIG. 4B. The number of SSB locations in a burst depends on the frequency range (e.g., 0-3 or 0-6 GHz as shown in FIG. 4b), as well as on the particular NR radio interface configuration. The SSB burst (hence the individual SSBs) are transmitted according to an SSB measurement timing configuration (SMTC) cycle, which may be 5, 10, 20, 40, 80 or 160 ms, as illustrated in FIG. 4C.

Despite the link budget gains provided by beamforming solutions, reliability of a system purely relying on beamforming and operating in higher frequencies might be challenging, since the coverage can be more sensitive to both time and space variations. Consequently, the signal-to-interference-plus-noise ratio (SINR) of such a narrow link can drop much quicker than in the case of LTE. Even in LTE, the serving cell may not be able to convey the handover command timely. By lowering the TTT and the measurement hysteresis, it can be possible to reduce the handover failure rate but it can also result in higher ping-pong probability. In NR, it is expected these effects can be even more pronounced when operating at higher frequency bands. Because of these issues and/or problems, improved mobility robustness is needed for NR systems.

Figure 5:
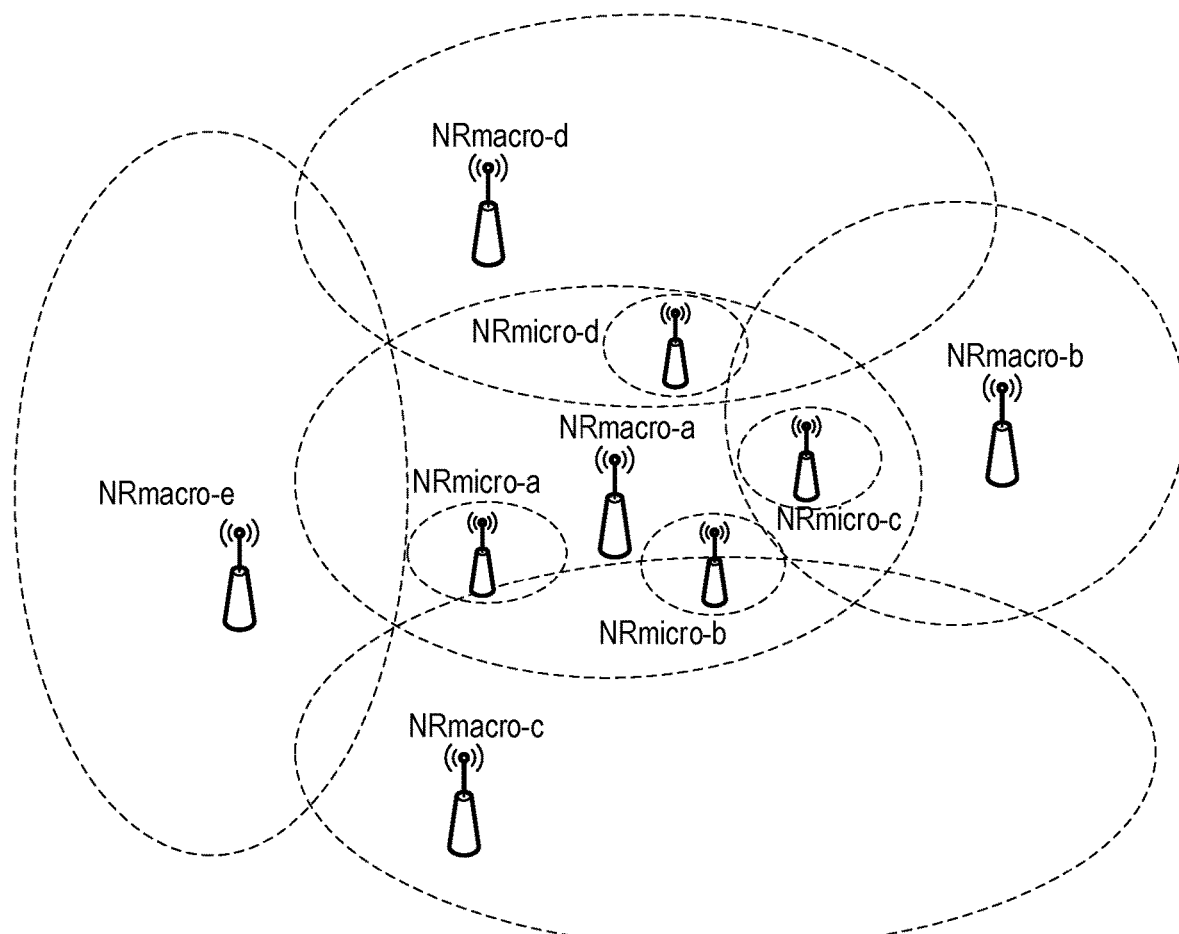
FIG. 5 shows an exemplary NR heterogeneous network ("HetNet") configuration.

Further improvements were introduced LTE Rel-12 to aid mobility in heterogeneous network ("HetNet") scenarios, and are equally applicable to NR HetNets, such as the exemplary NR HetNet shown in FIG. 5. The exemplary HetNet comprises five (5) macro cells ("NRmacro-a" through "NRmacro-e") and four (4) micro cells ("NRmicro-a" through "NRmicro-d"), all of which utilize NR technology. Although not shown, an exemplary UE can be situated within the coverage area of macro-a, referred to as UE's "serving cell." The UE can then be configured for RRM measurements of all, or a subset of, its neighbor cells comprising all microcells and macrocells b-d. One type of HetNet improvement introduced in Rel-12 is an alternativeTimeToTrigger (also referred to as "altTTT"). By configuring an alternate value of TTT for some neighbor cells compared to other neighbor cells, the network can facilitate improved UE measurement reporting that avoids and/or reduces both unnecessary and untimely (e.g., too late) measurement reports.

Even so, mobility problems and/or issues can be when more pronounced with NR networks operating in unlicensed spectrum (referred to as "NR-U"). This can be due, for example, to the transmissions both from the gNB and UE being blocked and/or delayed by the listen-before-talk (LBT) procedure. As mentioned above, the LBT procedure requires a node to first sense the channel as idle before acceding it. The time needed to sense the channel as idle differs in various scenarios and depends on the type of transmission that the node wants to perform. The sensing times can range from 25 microseconds to several milliseconds. In case many nodes contend for the channel, delays of hundreds of milliseconds are not uncommon.

The same motivations—minimizing and concentrating transmissions—that led to the introduction of a DRS in Rel-13 LAA is also applicable to NR-U and, as such, may lead to an introduction of DRS in NR-U. Even though any particular structure of such "DRS-like" signal is still to be determined by 3GPP RAN1 WG, and could differ from LTE DRS, the concentration of the transmissions provides fewer opportunities for the UE to make resource measurements in NR-U. This can result in delays in measuring and reporting critical information, such that various RRC measurement reports and commands/requests—handover command, handover complete, etc.—may be delayed and/or dropped, leading to handover failure.

One way to combat such failures is "conditional handover." One type of conditional-handover solution discussed in 3GPP RAN2 WG is "early handover command" or "conditional handover command" In order to avoid the undesired dependence of the serving radio link upon the time (and radio conditions) where the UE should execute the handover, RRC signaling for the handover command can be provided earlier to the UE. In such case, the handover command can be associated with a condition that, once fulfilled, enables the UE to execute the handover in accordance with the provided handover command.

Figure 6:
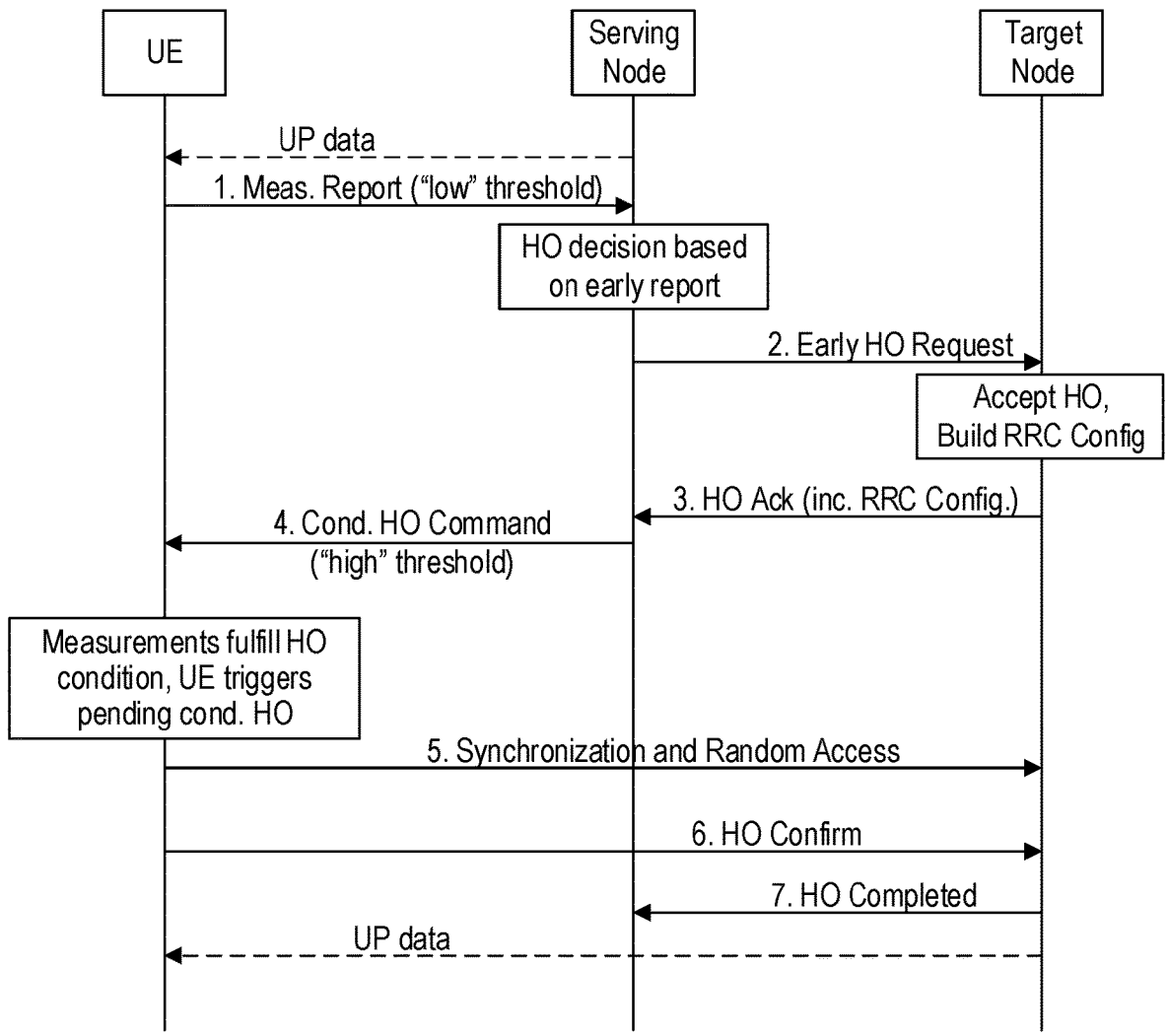
FIG. 6 shows an exemplary signal flow between a user equipment (UE), a serving network node, and a target network node for conditional handover (HO), according to exemplary embodiments of the present disclosure.

FIG. 6 illustrates an exemplary signal flow between a user equipment (UE), a serving network node, and a target network node for a conditional handover (HO), according to exemplary embodiments of the present disclosure. The serving and target network nodes can be, e.g., gNBs and/or components of gNBs, such as CUs and/or DUs. According to this principle, the UE can be provided with a measurement configuration sooner than during normal operating mode, for example, by lowering the offset in event A3. Then, the serving network node can request an early handover to the target network node based on these early measurement reports. The target network node performs admission control and responds with the handover acknowledgement that includes RRC configuration, similar to the basic handover shown in FIG. 6. The source network node then sends the "Conditional Handover Command" to the UE.

The UE, upon reception of this command, checks the given condition and whenever the condition is met, it can move to the target network node and performs the handover. Such a condition could e.g., be that the quality of the mobility RS (MRS) of the target cell or beam becomes X dB stronger than the mobility RS (MRS) of the serving cell. The threshold Y used in a preceding measurement reporting event should then be chosen lower than the one in the handover execution condition. As used in this context, Mobility Reference Signal (MRS) denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

It is possible in the baseline conditional HO described above that the UE stays in the source cell for an extended amount of time in case the HO condition is not fulfilled. There are several possible enhancements to the baseline conditional HO shown in FIG. 6 that can address this scenario. First, the network can decide to provide an updated RRCConnectionReconfiguration in a conditional HO command for a target cell for which it had previously provided a conditional HO command Correspondingly, if the UE receives conditional HO command for a target cell for which it has already a pending conditional HO command, it determines the target cell configuration based on its current serving cell configuration and the "delta" in the HO command and uses it to towards the target cell Second, the source network node can request the target network node to prolong the conditional HO command validity. If granted by the target, the source can send a new time limit to UE for the conditional HO command that allows more time before the conditional HO command is triggered.

Third, the source network node can decide based on the RRM measurements that the potential target cell must be changed. In this scenario, the source network node provides the conditional HO command to the UE with a new target cell and indicates that the UE shall discard the earlier provided conditional HO command Correspondingly, the UE should be prepared to receive, simultaneously, the cancellation of a previously received pending HO command to a first target cell and a new/updated conditional HO command for a second target cell.

Fourth, it may be possible and/or desirable to provide the UE with HO conditions and configurations for several candidate target cells. When receiving conditional HO commands for multiple target cells, the UE evaluates HO conditions for more than one candidate target cells and stores configurations for those individually. This can be performed, e.g., using two alternatives. The network informs in the conditional HO command that the RRCConnectionReconfiguration in the conditional HO command is applicable for several cells. Same conditional HO command applies to multiple cells. When the UE receives this kind of conditional HO command, it stores only one configuration associated with multiple target cells. Alternatively, the network provides conditional HO command with multiple cells and potentially multiple configurations. When receiving such configuration, the UE stores the current serving cell RRC configuration (RRC context). When the HO is triggered, the UE derives the corresponding target cell configuration based on said source cell configuration stored upon reception of the HO command and the parameters provided in the conditional HO command Using one or more of the above enhancements, it can be possible to send one conditional handover command with condition intended for multiple cells. Even if the conditional handover is provided in advance, however, it is not always clear at the time of the early handover command which target cell the UE will try to access in case of handover. In other words, it is typically left for UE implementation to decide which of the target cells to access for HO. To have some control over UE behavior in such cases, a further enhancement can include providing the UE with a priority ranking that instructs the UE the order in which it can access the target cells.

However, the conditional HO configuration may be different depending on the potential target cells in which a UE may be handed-over. For example, if the potential target cells are operating in different bands the conditions that the network may configure to perform conditional HO are different. A particular example of this case is when potential target cell A is operating in licensed band(s), and potential target cell B is operating in unlicensed band(s).

Exemplary embodiments of the present disclosure provide specific improvements to address these and other problems. Various embodiments include exemplary methods and/or procedures, performed by a serving network node (e.g., gNB or network node), for configuring a UE to measure different parameters in different cells. Various type of parameters and configuration criteria are described hereinbelow. These exemplary embodiments enable the network to prepare handover decisions more effectively and efficiently, particularly for unlicensed-band operation.

In some exemplary embodiment, the source network node configures the UE to measure different parameters in different cells. For example, for one target cell, said cell A, which is a cell operating in licensed band, the source network node configures the UE to measure the quality of the mobility RS (MRS) or beam and to trigger an event to report the quality of the target cell when the MR or beam of the target cell becomes X dB stronger than the mobility RS (MRS) or beam of the serving cell.

For another target cell, said cell B, which is a cell operating in unlicensed band, the source network node configures the UE to measure the congestion of the target cell, where some exemplary congestion metrics are discussed below. In some exemplary embodiments, the above-mentioned thresholds can be different depending on which action the UE should take, e.g., when the UE should trigger measurement reports to the network node, trigger a handover, or perform cell (re)selection. In the case of measurement reporting, the thresholds can be configured via dedicated RRC configuration signaling or via broadcast (e.g., system information block, SIB). On the other hand, in the case of handover, such thresholds can be signaled as part of the "conditional HO command" and used by the UE to determine whether to trigger the handover procedure towards the potential target cells whose measurements fulfill the configured thresholds. In the case of cell reselection, the thresholds can be provided via dedicated signaling and/or broadcast.

In some exemplary embodiments, the threshold configured for measurement reporting can be less aggressive (e.g., lower RSRP/higher congestion level), than the threshold configured for HO triggering or cell reselection (e.g., higher RSRP/lower congestion).

In some exemplary embodiments, the source network node can configure a plurality of conditions for the same target cell. For example, for the case of cell B, both the congestion and the MRS/beam quality of the target cell (e.g., RSRP/RSRQ level) can be considered when making a decision and/or taking an action. In other words, any number of such conditions can be required to be met before triggering a measurement report, a HO, or cell reselection. For example, both MRS quality and congestion status must be above/below their respective thresholds before performing one of these actions. In another example, less than all (e.g., only one) of such conditions must be fulfilled before performing one of these actions.

When configuring the above thresholds, the source network node may indicate the physical cell ID (PCI) and/or the PLMN and/or the neutral Host ID and/or the PSP-ID of the potential target cell, that the UE should measure and towards which the UE may perform handover upon satisfying the above criteria. Together with the above thresholds (which the source network node may configure differently for different cells), the source network node may also configure one or multiple priority list of the cells that the UE should measure and/or towards which the UE should perform HO. In some embodiments, the priority list can be a single priority list with all the cells listed in priority order thereon, and the UE should first try to perform HO towards the highest priority cells. In case some of the highest priority cells do not provide the services of interest, the UE is allowed to measure any other cells providing the service of interest following the priority order. For example, this can occur if the UE is interested in unlicensed operations and reception of a certain specific service (identified by the PSP-ID or NHN ID or PLMN-ID), but the highest priority cells do not provide such service (e.g., service barred or not provisioned).

In other embodiments, different cells can be grouped in different priority lists. For example, cells operating in unlicensed band can belong to a different priority list than the cells operating in licensed band. In one embodiment, all the cells belonging to the same priority list can be configured with the same type of measurement thresholds. For example, for all the cells belonging to the same priority list A, the UE can be configured to evaluate both the MRS quality and the congestion status, while for all the cells belonging to the same priority list B, the UE can be configured to evaluate only the MRS quality. In some embodiments, whether to first evaluate the cells belonging to priority list A, B, or both is left to UE implementation, discretion, and/or needs. For example, if the UE is interested in performing unlicensed operations (e.g., due to the fact that some neighboring cells are providing a service of interest that is not provided by other cells in priority list B), the UE shall monitor the cells in priority list A before monitoring those in list B.

Furthermore, although the exemplary embodiments discussed above were illustrated with configurations per cell or per group of cells, in some embodiments the configurations can apply to a carrier frequency, an entire band, or to certain set of resources within a carrier (e.g., resource pool, bandwidth part(s), etc.). Applicability in this manner can be particularly beneficial in case of measurement reporting or cell (re)selection.

Various exemplary embodiments for varying the measurement configurations among different cells, groups, etc. were discussed above. Unless expressly noted to the contrary, any of these embodiments can be used to configure any of the exemplary metrics, parameters, and/or thresholds discussed below. More specifically, any of the configuration embodiments discussed above can be used with any of the congestion-related metric/parameter/threshold embodiments discussed below. Furthermore, any of the above-described embodiments can be used to configure any of the congestion-related metrics, parameters, and/or thresholds together with any other common handover-related metrics like RSRP, RSRQ, or SNR.

In some exemplary embodiments, the congestion parameter and/or metric (also referred to herein as "channel utilization metric") that the source network node configures can be represented by the RSSI that the UE measures in target cell, or by the channel utilization the UE has measured, or by a congestion metric or margin broadcasted by a target cell. The UE may consider the last X number of slots/subframes/frames or in the last Y seconds.

In some exemplary embodiments, the congestion parameter and/or metric can also be based on the ratio of SMTC/DMTC windows where the UE could detect a DRS (or MRS) for each cell within the last Y seconds or X SMTC/DMTC periods. For example, if the UE failed to detect the serving gNB's DRS in four (4) of the last 10 periods, the congestion metric would be 40% for the serving cell. Likewise, if it failed to detect the DRS of a neighbor cell during two (2) out of the last 10 periods, the metric would be 20% for that neighbor cell. According to this metric, the serving cell is considered more congested than the neighbor cell. In another exemplary embodiment, the UE can evaluate the average or median time shift of the DRS (or MRS) for the serving cell and neighbor cells in the SMTC/DMTC window, within the last Y seconds or X SMTC/DMTC period.

In some exemplary embodiments, the congestion parameter and/or metric can depend, or be based, on how many times the channel has been sensed busy by the UE (e.g., LBT not successful) over the last X seconds/subframes, or how many times the channel has been sensed busy during the last X number of transmission attempts.

In other exemplary embodiments, the congestion parameter and/or metric can depend on how long the backoff timer has been running during the last X seconds/subframes or during the last X number of transmission attempts. Note that during a LBT procedure, once a UE detects that a channel is idle, it does not immediately transmit but instead generates a backoff timer with a value that is uniformly distributed within a contention window. This additional random sensing time helps avoid potential collisions, which may happen when two or more UEs (or other nodes) are simultaneously waiting on the channel to be clear for transmission.

In other exemplary embodiments, the congestion parameter and/or metric can be based on the average size of the contention window over the last X transmission attempts or Y seconds. Note that the UE can increase its contention window size after each consecutive unsuccessful LBT attempt, but reset the contention window size to a default value after a successful LBT attempt.

In other exemplary embodiments, the congestion parameter and/or metric can be based on the ratio of how many times the UE has failed LBT for its uplink transmission, even if it was ultimately successful (e.g., scheduled by the gNB).

In some exemplary embodiments, the source network node can configure the UE to report the congestion status (irrespective of what metric is used to represent the congestion), whenever the congestion metric and/or parameter is above a certain absolute threshold or relative threshold. For example, the source network node can configure a relative threshold that can be used, for example, when both the source cell and the target cell are unlicensed cells. As such, the UE can report congestion results of the target cell when the congestion of the source cell becomes greater than the target cell and/or when the congestion of the target cell becomes less than the congestion of the source cell. Other exemplary congestion-related conditions usable to trigger a particular radio-resource operation (e.g., reporting, handover, or reselection) can include:

Measured congestion of PCell>Measured congestion of target cell+Threshold

Measured congestion of PCell>Threshold1 and Measured congestion of target cell<Threshold2

Measured congestion of SCell>Measured congestion of target cell+Threshold

In some exemplary embodiments, the UE can filter the measurements used to determine the congestion metric and/or parameter prior to determining whether the condition is met. This ensures that any temporary increase or decrease in a measured metric would not overly impact the fulfillment of the condition. This can be beneficial, for example, in avoiding handover from one cell to another due to a short, temporary increase/decrease in congestion.

In addition to reporting upon fulfillment of the condition, the UE can also report any particular congestion metric and/or parameter (filtered and/or unfiltered) upon the occurrence of any other type of event. For example, the UE can send the congestion metric and/or parameter in a measurement report associated with any regular, periodic, and/or occasional quality-related event. The UE can report the congestion metric and/or parameter together with any other quality-related metrics, such as RSRP, RSRQ, etc. The measurement report containing such information can be sent and/or used for any purpose, including initiating handover or cell/beam reselection.

FIG. 7 is a flow diagram illustrating an exemplary method (e.g., procedure) for a user equipment (UE), operating in a serving cell in a radio access network (RAN), to perform measurements on a plurality of target cells in the RAN, according to various exemplary embodiments of the present disclosure. The exemplary method shown in FIG. 7 can be implemented, for example, in a wireless device and/or UE shown in, or described in relation to, other figures herein. Furthermore, the exemplary method shown in FIG. 7 can be utilized cooperatively with other exemplary methods described herein (e.g., in FIG. 8) to provide various exemplary benefits described herein. Although FIG. 7 shows blocks in a particular order, this order is merely exemplary such that the operations of the exemplary method can be performed in a different order than shown, and can be combined and/or divided into blocks having different functionality than shown. Optional operations are indicated by dashed lines.

The exemplary method illustrated in FIG. 7 can include the operations of block 710, in which the UE can receive a measurement configuration relating to relating to one or more radio resource operations. The measurement configuration can include a first set of conditions relating to a first target cell of the target cells, and a second set of conditions relating to a second target cell of the target cells. In some embodiments, the one or more radio-resource operations can include at least one of the following: measurement reporting, handover, conditional handover, and cell or beam reselection.

In some embodiments, the second set of conditions includes at least one condition that is not included in the first set of conditions. In some embodiments, the measurement configuration can relate to a plurality of radio-resource operations involving the plurality of cells. In such embodiments, the first set of conditions can include a plurality of first subsets of conditions, with each of the plurality of radio-resource operations being associated with a particular one of the first subsets. Also, in such embodiments, the second set of conditions can include a plurality of second subsets of conditions, with each of the plurality of radio-resource operations being associated with a particular one of the second subsets.

The exemplary method can also include the operations of block 720, in which the UE can perform measurements of radio signals associated with at least one of the first target cell and the second target cell. In some embodiments, the radio signals from the first target cell can be received in a licensed band and the radio signals from the second target cell are received in an unlicensed band, or vice versa.

In some embodiments, the first target cell can be one of a first group of cells associated with the first set of conditions, and the second cell can be one of a second group of cells associated with the second set of conditions. In such embodiments, the operations of block 720 can also include the operations of sub-block 721, where the UE can prioritize measurements of radio signals associated with the first group relative to measurements of radio signals associated with the second group.

In some embodiments, the operations of block 720 can also include the operations of sub-block 722, where the UE can determine, based on the measurement results, respective congestion metrics associated with the at least one of the first target cell and the second target cell. In some embodiments, the respective congestion metrics can be determined based on one or more of the following:

A ratio of a number of unsuccessful detections of a mobility reference signal, MRS, to a total number of MRS detection attempts during a previous time period; and A ratio of a number of unsuccessful listen-before-talk, LBT, attempts to a total number of LBT attempts;

An average contention window size during the total number of LBT attempts; and

An average running duration of a backoff timer during the total number of LBT attempts.

In some embodiments, the total number of MRS detection attempts and/or the total number of LBT attempts can be based on one of the following: a predetermined number of attempts, or a predetermined time period.

In some embodiments, the operations of block 720 can also include the operations of sub-block 723, where the UE can determine, based on the measurement results, respective quality metrics associated with the at least one of the first target cell and the second target cell. In some embodiments, the respective quality metrics can be determined based on one or more of the following:

Received signal strength indication (RSSI);
Reference signal received power (RSRP);
Reference signal received quality (RSRQ);
Signal-to-noise ratio (SNR); and
Signal-to-interference-plus-noise ratio (SINR).

The exemplary method can also include the operations of block 730, in which the UE can perform a radio-resource operation with respect to the first target cell, based on a first determination that the measurements of the radio signals associated with the first target cell fulfill at least one condition of the first set. For example, the performed radio resource operation can be one of the radio resource operations related to the measurement configuration received in block 710. In some embodiments, the operations of block 730 can also include the operations of sub-block 733, where the UE can perform the radio-resource operation with respect to the first target cell if the one or more measurements fulfill all conditions of the first set.

In some embodiments, the operations of block 730 can also include the operations of sub-block 731, where the UE can prioritize the radio resource operation for the first target cell by performing the radio resource operation based on the first determination, without performing measurements of radio signals associated with the second target cell. In some embodiments, the operations of block 730 can also include the operations of sub-block 732, where the UE can prioritize the radio resource operation for the first target cell by performing the first determination before a second determination performed in block 740, described below.

In embodiments where the first set of conditions comprises multiple subsets, the operations of block 730 can also include the operations of sub-block 734, where the UE can perform a first radio resource operation based on a first determination that the measurements of the radio signals associated with the first target cell fulfill at least one condition of a particular first subset. Such embodiments can also include the operations of sub-block 735, where the UE can perform a second radio resource operation based on a first determination that the measurements of the radio signals associated with the first target cell fulfill at least one condition of a further first subset.

In embodiments where the UE determines respective congestion metrics (e.g., in sub-block 722), the first determination that the measurements of the radio signals associated with the first target cell fulfill at least one condition of the first set can include a comparison between the congestion metric associated with the first target cell and a congestion threshold. Likewise, in embodiments where the UE determines respective congestion metrics (e.g., in sub-block 723), the first determination that the measurements of the radio signals associated with the first target cell fulfill at least one condition of the first set can include a comparison between the quality metric associated with the first target cell and a quality threshold.

The exemplary method can also include the operations of block 740, in which the UE can perform the radio-resource operation with respect to the second target cell, based on a second determination that the measurements of the radio signals associated with the second target cell fulfill at least one condition of the second set. Although not explicitly shown in FIG. 7, it should be understood that in various embodiments, the operations of block 740 can include, be comparable to, and/or correspond to various operations described above in relation to block 730. As an example, the operations of block 740 can include operations corresponding to sub-blocks 734 and/or 735, but with respect to a second target call and multiple second subsets of conditions. As another example, various congestion and/or quality metrics and thresholds can be utilized in the operations of block 740 in a similar manner as described above with respect to block 730.

Figure 8:
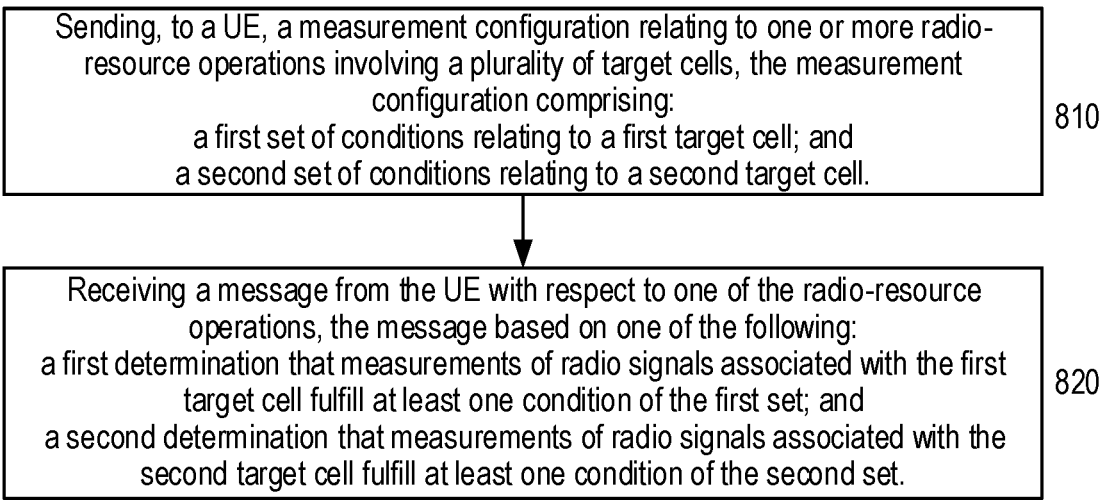
FIG. 8 is a flow diagram illustrating exemplary methods performed by a network node (e.g., base station, eNB, gNB, etc.) according to various exemplary embodiments of the present disclosure.

FIG. 8 is a flow diagram illustrating an exemplary method (e.g., procedure) for configuring a user equipment (UE), operating in a serving cell in a radio access network (RAN), to perform measurements on a plurality of target cells in the RAN, according to various exemplary embodiments of the present disclosure. The exemplary method shown in FIG. 8 can be implemented, for example, in one or more of the network nodes in the RAN (e.g., base station, eNB, gNB, etc.) that are shown in, or described in relation to, other figures herein. Furthermore, the exemplary method shown in FIG. 8 can be utilized cooperatively with other exemplary methods described herein (e.g., in FIG. 7) to provide various exemplary benefits described herein. Although FIG. 8 shows blocks in a particular order, this order is merely exemplary such that the operations of the exemplary method can be performed in a different order than shown, and can be combined and/or divided into blocks having different functionality than shown. Optional operations are indicated by dashed lines.

The exemplary method illustrated in FIG. 8 can include the operations of block 810, in which the network node can send, to the UE, a measurement configuration relating to one or more radio resource operations. The measurement configuration can include a first set of conditions relating to a first target cell of the target cells, and a second set of conditions relating to a second target cell of the target cells. In some embodiments, the one or more radio-resource operations can include at least one of the following: measurement reporting, handover, conditional handover, and cell or beam reselection. In some embodiments, the first target cell can operate in a licensed band and the second target cell can operate in an unlicensed band, or vice versa.

In some embodiments, the second set of conditions includes at least one condition that is not included in the first set of conditions. In some embodiments, the measurement configuration can relate to a plurality of radio-resource operations involving the plurality of cells. In such embodiments, the first set of conditions can include a plurality of first subsets of conditions, with each of the plurality of radio-resource operations being associated with a particular one of the first subsets. Also, in such embodiments, the second set of conditions can include a plurality of second subsets of conditions, with each of the plurality of radio-resource operations being associated with a particular one of the second subsets.

The exemplary method can also include the operations of block 820, in which the network node can receive a message from the UE with respect to one of the radio-resource operations. The message can be based on one of the following: a first determination that measurements of radio signals associated with the first target cell fulfill at least one condition of the first set; and a second determination that measurements of radio signals associated with the second target cell fulfill at least one condition of the second set.

In some embodiments, the first target cell can be one of a first group of cells associated with the first set of conditions, and the second cell can be one of a second group of cells associated with the second set of conditions. In such embodiments, measurements of radio signals associated with the first group can be prioritized relative to measurements of radio signals associated with the second group. In other embodiments, the radio resource operation can be prioritized for the first target cell relative to the second target cell, based on the first determination being prioritized before the second determination.

In some embodiments, at least one of the first set of conditions and the second set of conditions can include a congestion threshold. In such embodiments, the first determination that the measurements of the radio signals associated with the first target cell fulfill at least one condition of the first set can include a comparison between a congestion metric associated with the first target cell and the congestion threshold. In various embodiments, the congestion metric can be determined based on one or more of the following:

- A ratio of a number of unsuccessful detections of a mobility reference signal, MRS, to a total number of MRS detection attempts during a previous time period; and
- A ratio of a number of unsuccessful listen-before-talk, LBT, attempts to a total number of LBT attempts;
- An average contention window size during the total number of LBT attempts; and
- An average running duration of a backoff timer during the total number of LBT attempts.

In some embodiments, the total number of MRS detection attempts and/or the total number of LBT attempts can be based on one of the following: a predetermined number of attempts, or a predetermined time period.

In some embodiments, at least one of the first set of conditions and the second set of conditions cann include a quality threshold. In such embodiments, the first determination that the measurements of the radio signals associated with the first target cell fulfill at least one condition of the first set can include a comparison between a quality metric associated with the first target cell and the quality threshold. In various embodiments, the quality metric can be determined based on one or more of the following:

- Received signal strength indication (RSSI);
- Reference signal received power (RSRP);
- Reference signal received quality (RSRQ);
- Signal-to-noise ratio (SNR); and
- Signal-to-interference-plus-noise ratio (SINR).

Figure 9:
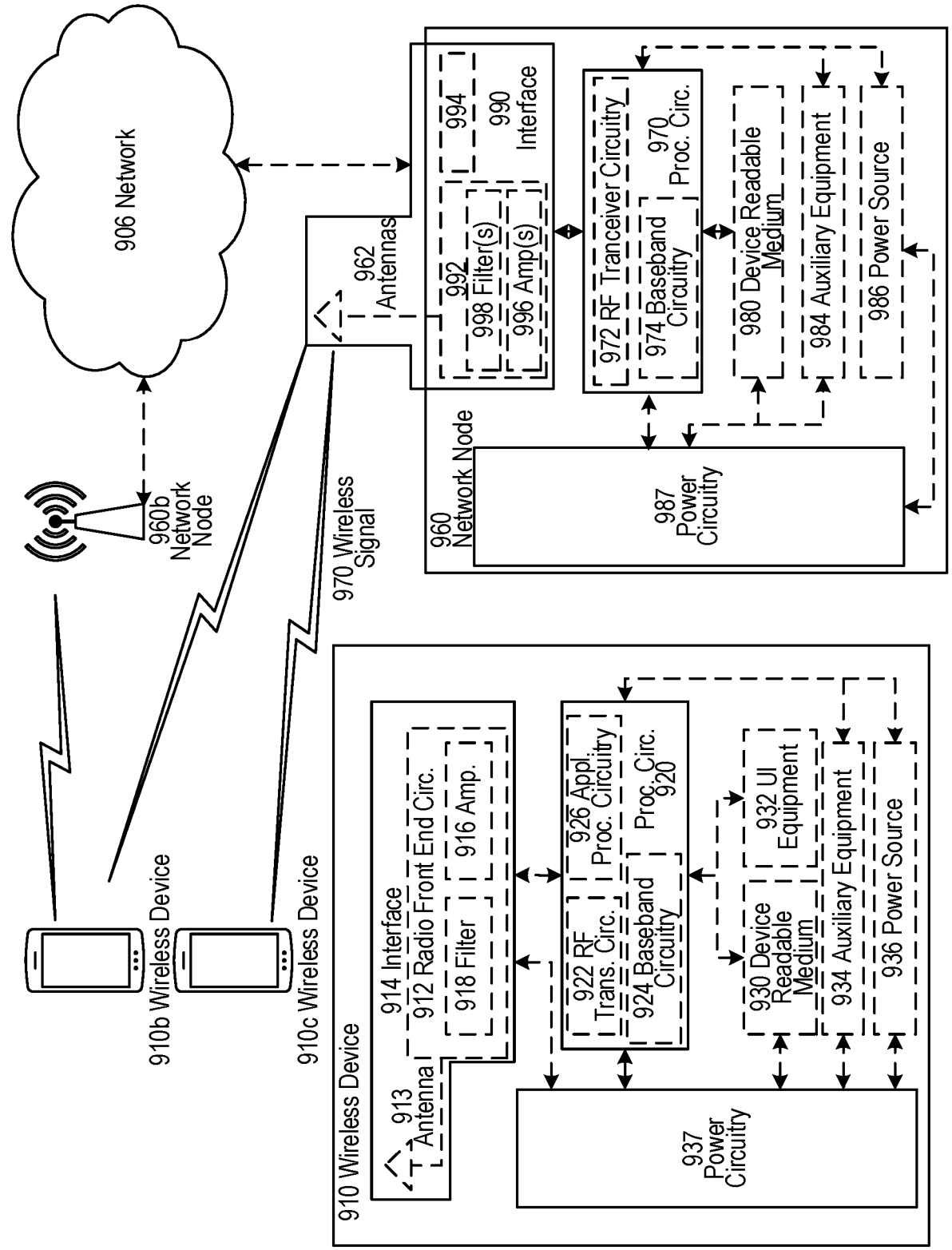
FIG. 9 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network can further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 can represent a device that includes the illustrated combination of hardware components, other embodiments can comprise network nodes with different combinations of components. It is to be understood that a network node comprises any suitable combination of hardware and/or software needed to perform the tasks, features, functions, and methods and/or procedures disclosed herein. Moreover, while the components of network node 960 are depicted as single boxes located within a larger box, or nested within multiple boxes, in practice, a network node can comprise multiple different physical components that make up a single illustrated component (e.g., device readable medium 980 can comprise multiple separate hard drives as well as multiple RAM modules).

Similarly, network node 960 can be composed of multiple physically separate components (e.g., a NodeB component and a RNC component, or a BTS component and a BSC component, etc.), which can each have their own respective components. In certain scenarios in which network node 960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 960 can be configured to support multiple radio access technologies (RATs). In such embodiments, some components can be duplicated (e.g., separate device readable medium 980 for the different RATs) and some components can be reused (e.g., the same antenna 962 can be shared by the RATs). Network node 960 can also include multiple sets of the various illustrated components for different wireless technologies integrated into network node 960, such as, for example, GSM, WCDMA, LTE, NR, WiFi, or Bluetooth wireless technologies. These wireless technologies can be integrated into the same or different chip or set of chips and other components within network node 960.

Processing circuitry 970 can be configured to perform any determining, calculating, or similar operations (e.g., certain obtaining operations) described herein as being provided by a network node. These operations performed by processing circuitry 970 can include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 can execute instructions stored in device readable medium 980 or in memory within processing circuitry 970. Such functionality can include providing any of the various wireless features, functions, or benefits discussed herein. In some embodiments, processing circuitry 970 can include a system on a chip (SOC).

In some embodiments, processing circuitry 970 can include one or more of radio frequency (RF) transceiver circuitry 972 and baseband processing circuitry 974. In some embodiments, radio frequency (RF) transceiver circuitry 972 and baseband processing circuitry 974 can be on separate chips (or sets of chips), boards, or units, such as radio units and digital units. In alternative embodiments, part or all of RF transceiver circuitry 972 and baseband processing circuitry 974 can be on the same chip or set of chips, boards, or units In certain embodiments, some or all of the functionality described herein as being provided by a network node, base station, eNB or other such network device can be performed by processing circuitry 970 executing instructions stored on device readable medium 980 or memory within processing circuitry 970. In alternative embodiments, some or all of the functionality can be provided by processing circuitry 970 without executing instructions stored on a separate or discrete device readable medium, such as in a hard-wired manner In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 970. Device readable medium 980 can store any suitable instructions, data or information, including a computer program, software, an application including one or more of logic, rules, code, tables, etc. and/or other instructions capable of being executed by processing circuitry 970 and, utilized by network node 960. Device readable medium 980 can be used to store any calculations made by processing circuitry 970 and/or any data received via interface 990. In some embodiments, processing circuitry 970 and device readable medium 980 can be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that can be coupled to, or in certain embodiments a part of, antenna 962. Radio front end circuitry 992 comprises filters 998 and amplifiers 996. Radio front end circuitry 992 can be connected to antenna 962 and processing circuitry 970. Radio front end circuitry can be configured to condition signals communicated between antenna 962 and processing circuitry 970. Radio front end circuitry 992 can receive digital data that is to be sent out to other network nodes or WDs via a wireless connection. Radio front end circuitry 992 can convert the digital data into a radio signal having the appropriate channel and bandwidth parameters using a combination of filters 998 and/or amplifiers 996. The radio signal can then be transmitted via antenna 962. Similarly, when receiving data, antenna 962 can collect radio signals which are then converted into digital data by radio front end circuitry 992. The digital data can be passed to processing circuitry 970. In other embodiments, the interface can comprise different components and/or different combinations of components.

In certain alternative embodiments, network node 960 may not include separate radio front end circuitry 992, instead, processing circuitry 970 can comprise radio front end circuitry and can be connected to antenna 962 without separate radio front end circuitry 992. Similarly, in some embodiments, all or some of RF transceiver circuitry 972 can be considered a part of interface 990. In still other embodiments, interface 990 can include one or more ports or terminals 994, radio front end circuitry 992, and RF transceiver circuitry 972, as part of a radio unit (not shown), and interface 990 can communicate with baseband processing circuitry 974, which is part of a digital unit (not shown).

Antenna 962 can include one or more antennas, or antenna arrays, configured to send and/or receive wireless signals. Antenna 962 can be coupled to radio front end circuitry 990 and can be any type of antenna capable of transmitting and receiving data and/or signals wirelessly. In some embodiments, antenna 962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 962 can be separate from network node 960 and can be connectable to network node 960 through an interface or port.

Antenna 962, interface 990, and/or processing circuitry 970 can be configured to perform any receiving operations and/or certain obtaining operations described herein as being performed by a network node. Any information, data and/or signals can be received from a wireless device, another network node and/or any other network equipment. Similarly, antenna 962, interface 990, and/or processing circuitry 970 can be configured to perform any transmitting operations described herein as being performed by a network node. Any information, data and/or signals can be transmitted to a wireless device, another network node and/or any other network equipment.

Power circuitry 987 can comprise, or be coupled to, power management circuitry and can be configured to supply the components of network node 960 with power for performing the functionality described herein. Power circuitry 987 can receive power from power source 986. Power source 986 and/or power circuitry 987 can be configured to provide power to the various components of network node 960 in a form suitable for the respective components (e.g., at a voltage and current level needed for each respective component). Power source 986 can either be included in, or external to, power circuitry 987 and/or network node 960. For example, network node 960 can be connectable to an external power source (e.g., an electricity outlet) via an input circuitry or interface such as an electrical cable, whereby the external power source supplies power to power circuitry 987. As a further example, power source 986 can comprise a source of power in the form of a battery or battery pack which is connected to, or integrated in, power circuitry 987. The battery can provide backup power should the external power source fail. Other types of power sources, such as photovoltaic devices, can also be used.

Alternative embodiments of network node 960 can include additional components beyond those shown in FIG. 9 that can be responsible for providing certain aspects of the network node's functionality, including any of the functionality described herein and/or any functionality necessary to support the subject matter described herein. For example, network node 960 can include user interface equipment to allow and/or facilitate input of information into network node 960 and to allow and/or facilitate output of information from network node 960. This can allow and/or facilitate a user to perform diagnostic, maintenance, repair, and other administrative functions for network node 960.

In some embodiments, a wireless device (WD) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 can include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies can be integrated into the same or different chips or set of chips as other components within WD 910.

Antenna 911 can include one or more antennas or antenna arrays, configured to send and/or receive wireless signals, and is connected to interface 914. In certain alternative embodiments, antenna 911 can be separate from WD 910 and be connectable to WD 910 through an interface or port. Antenna 911, interface 914, and/or processing circuitry 920 can be configured to perform any receiving or transmitting operations described herein as being performed by a WD. Any information, data and/or signals can be received from a network node and/or another WD. In some embodiments, radio front end circuitry and/or antenna 911 can be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and can be configured to condition signals communicated between antenna 911 and processing circuitry 920. Radio front end circuitry 912 can be coupled to or a part of antenna 911. In some embodiments, WD 910 may not include separate radio front end circuitry 912; rather, processing circuitry 920 can comprise radio front end circuitry and can be connected to antenna 911. Similarly, in some embodiments, some or all of RF transceiver circuitry 922 can be considered a part of interface 914. Radio front end circuitry 912 can receive digital data that is to be sent out to other network nodes or WDs via a wireless connection. Radio front end circuitry 912 can convert the digital data into a radio signal having the appropriate channel and bandwidth parameters using a combination of filters 918 and/or amplifiers 916. The radio signal can then be transmitted via antenna 911. Similarly, when receiving data, antenna 911 can collect radio signals which are then converted into digital data by radio front end circuitry 912. The digital data can be passed to processing circuitry 920. In other embodiments, the interface can comprise different components and/or different combinations of components.

Processing circuitry 920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality can include providing any of the various wireless features or benefits discussed herein. For example, processing circuitry 920 can execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry can comprise different components and/or different combinations of components. In certain embodiments processing circuitry 920 of WD 910 can comprise a SOC. In some embodiments, RF transceiver circuitry 922, baseband processing circuitry 924, and application processing circuitry 926 can be on separate chips or sets of chips. In alternative embodiments, part or all of baseband processing circuitry 924 and application processing circuitry 926 can be combined into one chip or set of chips, and RF transceiver circuitry 922 can be on a separate chip or set of chips. In still alternative embodiments, part or all of RF transceiver circuitry 922 and baseband processing circuitry 924 can be on the same chip or set of chips, and application processing circuitry 926 can be on a separate chip or set of chips. In yet other alternative embodiments, part or all of RF transceiver circuitry 922, baseband processing circuitry 924, and application processing circuitry 926 can be combined in the same chip or set of chips. In some embodiments, RF transceiver circuitry 922 can be a part of interface 914. RF transceiver circuitry 922 can condition RF signals for processing circuitry 920.

In certain embodiments, some or all of the functionality described herein as being performed by a WD can be provided by processing circuitry 920 executing instructions stored on device readable medium 930, which in certain embodiments can be a computer-readable storage medium. In alternative embodiments, some or all of the functionality can be provided by processing circuitry 920 without executing instructions stored on a separate or discrete device readable storage medium, such as in a hard-wired manner In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 can be configured to perform any determining, calculating, or similar operations (e.g., certain obtaining operations) described herein as being performed by a WD. These operations, as performed by processing circuitry 920, can include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 can be operable to store a computer program, software, an application including one or more of logic, rules, code, tables, etc. and/or other instructions capable of being executed by processing circuitry 920. Device readable medium 930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 920. In some embodiments, processing circuitry 920 and device readable medium 930 can be considered to be integrated.

User interface equipment 932 can include components that allow and/or facilitate a human user to interact with WD 910. Such interaction can be of many forms, such as visual, audial, tactile, etc. User interface equipment 932 can be operable to produce output to the user and to allow and/or facilitate the user to provide input to WD 910. The type of interaction can vary depending on the type of user interface equipment 932 installed in WD 910. For example, if WD 910 is a smart phone, the interaction can be via a touch screen; if WD 910 is a smart meter, the interaction can be through a screen that provides usage (e.g., the number of gallons used) or a speaker that provides an audible alert (e.g., if smoke is detected). User interface equipment 932 can include input interfaces, devices and circuits, and output interfaces, devices and circuits. User interface equipment 932 can be configured to allow and/or facilitate input of information into WD 910, and is connected to processing circuitry 920 to allow and/or facilitate processing circuitry 920 to process the input information. User interface equipment 932 can include, for example, a microphone, a proximity or other sensor, keys/buttons, a touch display, one or more cameras, a USB port, or other input circuitry. User interface equipment 932 is also configured to allow and/or facilitate output of information from WD 910, and to allow and/or facilitate processing circuitry 920 to output information from WD 910. User interface equipment 932 can include, for example, a speaker, a display, vibrating circuitry, a USB port, a headphone interface, or other output circuitry. Using one or more input and output interfaces, devices, and circuits, of user interface equipment 932, WD 910 can communicate with end users and/or the wireless network, and allow and/or facilitate them to benefit from the functionality described herein.

Auxiliary equipment 934 is operable to provide more specific functionality which may not be generally performed by WDs. This can comprise specialized sensors for doing measurements for various purposes, interfaces for additional types of communication such as wired communications etc. The inclusion and type of components of auxiliary equipment 934 can vary depending on the embodiment and/or scenario.

Power source 936 can, in some embodiments, be in the form of a battery or battery pack. Other types of power sources, such as an external power source (e.g., an electricity outlet), photovoltaic devices or power cells, can also be used. WD 910 can further comprise power circuitry 937 for delivering power from power source 936 to the various parts of WD 910 which need power from power source 936 to carry out any functionality described or indicated herein. Power circuitry 937 can in certain embodiments comprise power management circuitry. Power circuitry 937 can additionally or alternatively be operable to receive power from an external power source; in which case WD 910 can be connectable to the external power source (such as an electricity outlet) via input circuitry or an interface such as an electrical power cable. Power circuitry 937 can also in certain embodiments be operable to deliver power from an external power source to power source 936. This can be, for example, for the charging of power source 936. Power circuitry 937 can perform any converting or other modification to the power from power source 936 to make it suitable for supply to the respective components of WD 910.

Figure 10:
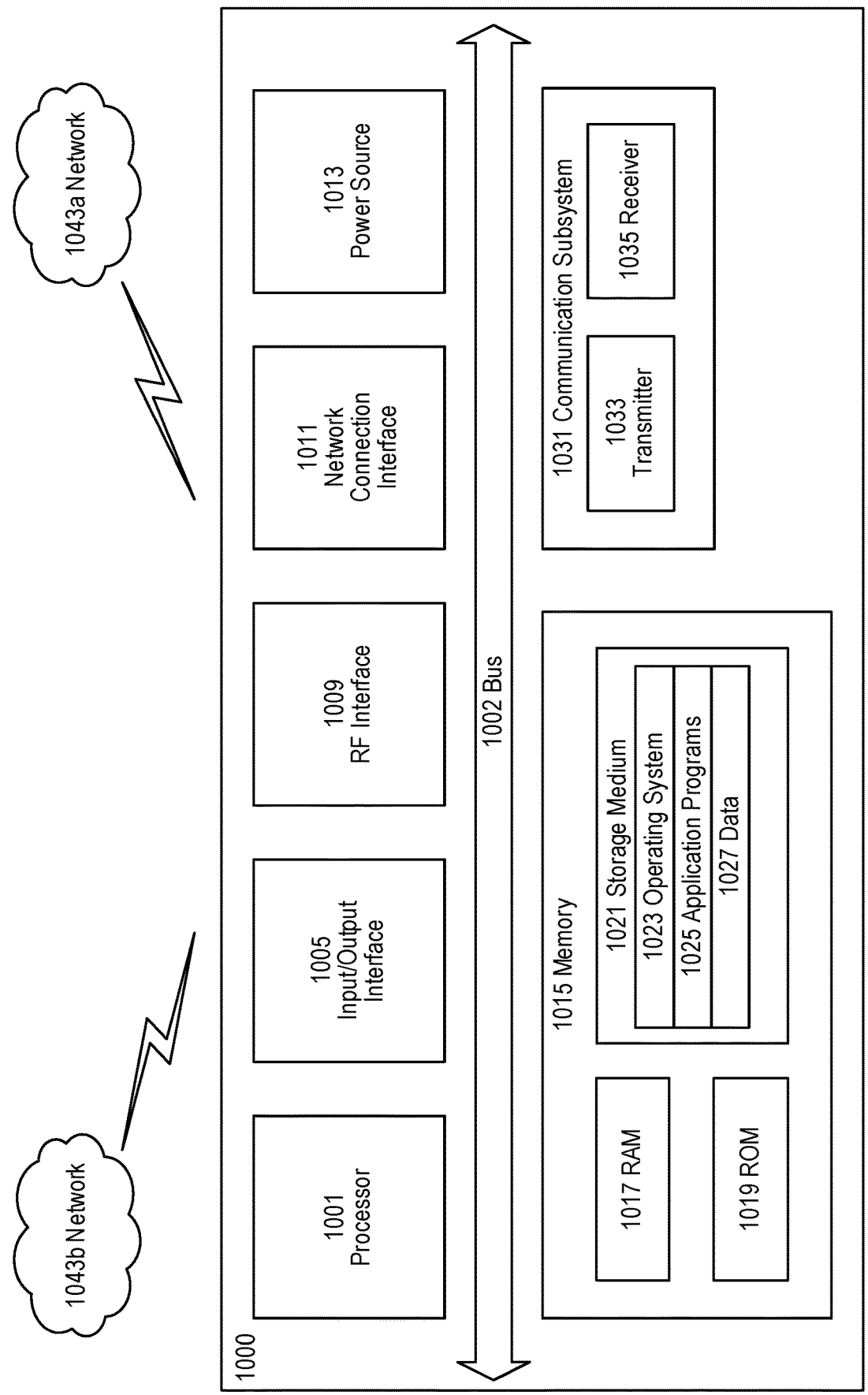
FIG. 10 illustrates an exemplary embodiment of a UE, according to various exemplary embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 10200 can be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 can include other similar types of information. Certain UEs can utilize all of the components shown in FIG. 10, or only a subset of the components. The level of integration between the components can vary from one UE to another UE. Further, certain UEs can contain multiple instances of a component, such as multiple processors, memories, transceivers, transmitters, receivers, etc.

In FIG. 10, processing circuitry 1001 can be configured to process computer instructions and data. Processing circuitry 1001 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 can include two central processing units (CPUs). Data can be information in a form suitable for use by a computer.

In the depicted embodiment, input/output interface 1005 can be configured to provide a communication interface to an input device, output device, or input and output device. UE 1000 can be configured to use an output device via input/output interface 1005. An output device can use the same type of interface port as an input device. For example, a USB port can be used to provide input to and output from UE 1000. The output device can be a speaker, a sound card, a video card, a display, a monitor, a printer, an actuator, an emitter, a smartcard, another output device, or any combination thereof. UE 1000 can be configured to use an input device via input/output interface 1005 to allow and/or facilitate a user to capture information into UE 1000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 10, RF interface 1009 can be configured to provide a communication interface to RF components such as a transmitter, a receiver, and an antenna. Network connection interface 1011 can be configured to provide a communication interface to network 1043a. Network 1043a can encompass wired and/or wireless networks such as a local-area network (LAN), a wide-area network (WAN), a computer network, a wireless network, a telecommunications network, another like network or any combination thereof. For example, network 1043a can comprise a Wi-Fi network. Network connection interface 1011 can be configured to include a receiver and a transmitter interface used to communicate with one or more other devices over a communication network according to one or more communication protocols, such as Ethernet, TCP/IP, SONET, ATM, or the like. Network connection interface 1011 can implement receiver and transmitter functionality appropriate to the communication network links (e.g., optical, electrical, and the like). The transmitter and receiver functions can share circuit components, software or firmware, or alternatively can be implemented separately.

RAM 1017 can be configured to interface via bus 1002 to processing circuitry 1001 to provide storage or caching of data or computer instructions during the execution of software programs such as the operating system, application programs, and device drivers. ROM 1019 can be configured to provide computer instructions or data to processing circuitry 1001. For example, ROM 1019 can be configured to store invariant low-level system code or data for basic system functions such as basic input and output (I/O), startup, or reception of keystrokes from a keyboard that are stored in a non-volatile memory. Storage medium 1021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 can be configured to include operating system 1023, application program 1025 such as a web browser application, a widget or gadget engine or another application, and data file 1027. Storage medium 1021 can store, for use by UE 1000, any of a variety of various operating systems or combinations of operating systems.

Storage medium 1021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 can allow and/or facilitate UE 1000 to access computer-executable instructions, application programs or the like, stored on transitory or non-transitory memory media, to off-load data, or to upload data. An article of manufacture, such as one utilizing a communication system can be tangibly embodied in storage medium 1021, which can comprise a device readable medium.

In FIG. 10, processing circuitry 1001 can be configured to communicate with network 1043b using communication subsystem 1031. Network 1043a and network 1043b can be the same network or networks or different network or networks. Communication subsystem 1031 can be configured to include one or more transceivers used to communicate with network 1043b. For example, communication subsystem 1031 can be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver can include transmitter 1033 and/or receiver 1035 to implement transmitter or receiver functionality, respectively, appropriate to the RAN links (e.g., frequency allocations and the like). Further, transmitter 1033 and receiver 1035 of each transceiver can share circuit components, software or firmware, or alternatively can be implemented separately.

In the illustrated embodiment, the communication functions of communication subsystem 1031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 can include cellular communication, Wi-Fi communication, Bluetooth communication, and GPS communication. Network 1043b can encompass wired and/or wireless networks such as a local-area network (LAN), a wide-area network (WAN), a computer network, a wireless network, a telecommunications network, another like network or any combination thereof. For example, network 1043b can be a cellular network, a Wi-Fi network, and/or a near-field network. Power source 1013 can be configured to provide alternating current (AC) or direct current (DC) power to components of UE 1000.

The features, benefits and/or functions described herein can be implemented in one of the components of UE 1000 or partitioned across multiple components of UE 1000. Further, the features, benefits, and/or functions described herein can be implemented in any combination of hardware, software or firmware. In one example, communication subsystem 1031 can be configured to include any of the components described herein. Further, processing circuitry 1001 can be configured to communicate with any of such components over bus 1002. In another example, any of such components can be represented by program instructions stored in memory that when executed by processing circuitry 1001 perform the corresponding functions described herein. In another example, the functionality of any of such components can be partitioned between processing circuitry 1001 and communication subsystem 1031. In another example, the non-computationally intensive functions of any of such components can be implemented in software or firmware and the computationally intensive functions can be implemented in hardware.

Figure 11:
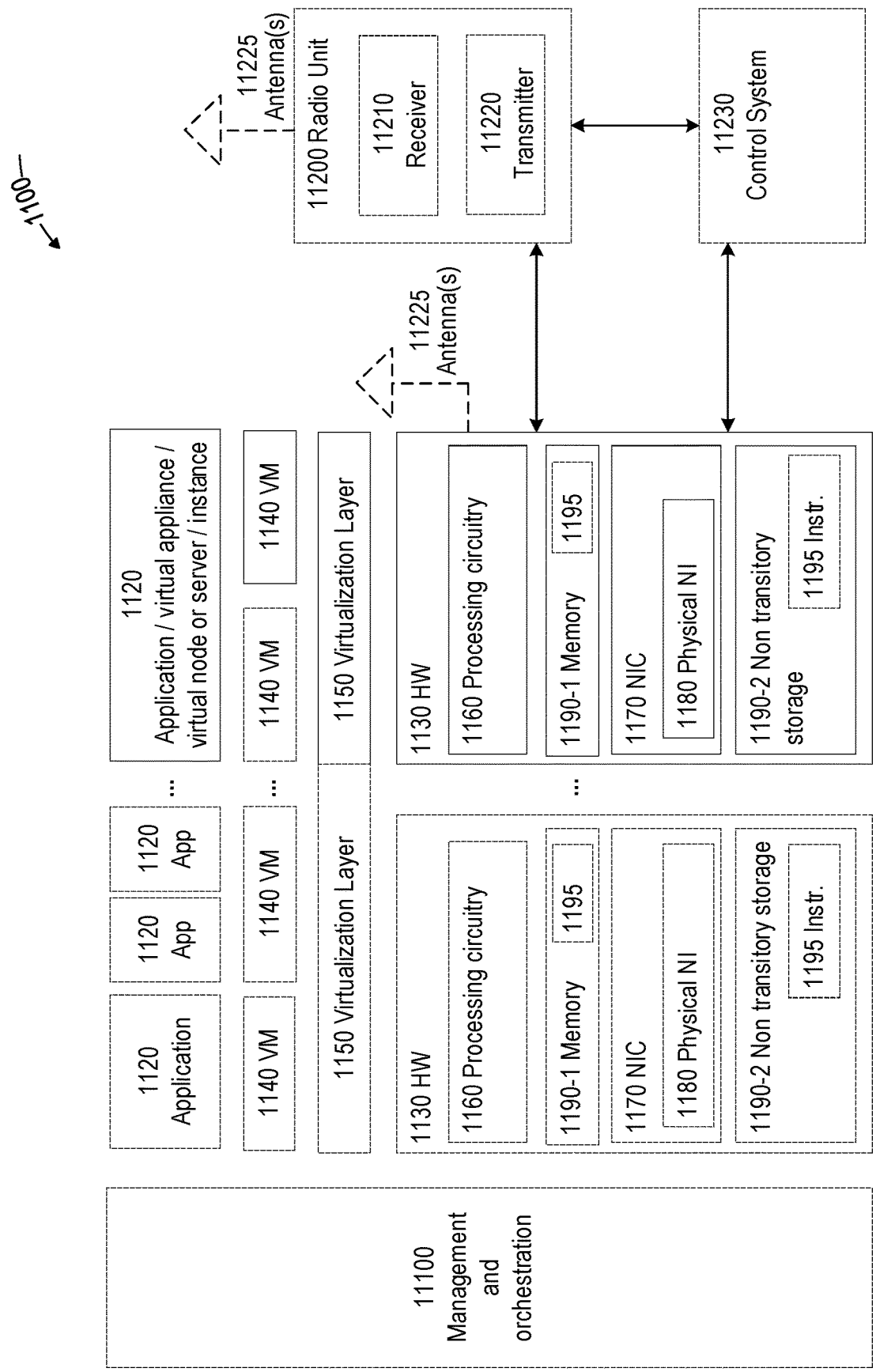
FIG. 11 is a block diagram illustrating an exemplary virtualization environment usable for implementation of various exemplary embodiments of the present disclosure.

FIG. 11 is a schematic block diagram illustrating a virtualization environment 1100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node can be entirely virtualized.

The functions can be implemented by one or more applications 1120 (which can alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which can be commercial off-the-shelf (COTS) processors, dedicated Application Specific Integrated Circuits (ASICs), or any other type of processing circuitry including digital or analog hardware components or special purpose processors. Each hardware device can comprise memory 1190-1 which can be non-persistent memory for temporarily storing instructions 1195 or software executed by processing circuitry 1160. Each hardware device can comprise one or more network interface controllers (NICs) 1170, also known as network interface cards, which include physical network interface 1180. Each hardware device can also include non-transitory, persistent, machine-readable storage media 1190-2 having stored therein software 1195 and/or instructions executable by processing circuitry 1160. Software 1195 can include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and can be run by a corresponding virtualization layer 1150 or hypervisor. Different embodiments of the instance of virtual appliance 1120 can be implemented on one or more of virtual machines 1140, and the implementations can be made in different ways.

During operation, processing circuitry 1160 executes software 1195 to instantiate the hypervisor or virtualization layer 1150, which can sometimes be referred to as a virtual machine monitor (VMM). Virtualization layer 1150 can present a virtual operating platform that appears like networking hardware to virtual machine 1140.

As shown in FIG. 11, hardware 1130 can be a standalone network node with generic or specific components. Hardware 1130 can comprise antenna 11225 and can implement some functions via virtualization. Alternatively, hardware 1130 can be part of a larger cluster of hardware (e.g., such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1140 can be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 can be coupled to one or more antennas 11225. Radio units 11200 can communicate directly with hardware nodes 1130 via one or more appropriate network interfaces and can be used in combination with the virtual components to provide a virtual node with radio capabilities, such as a radio access node or a base station.

In some embodiments, some signalling can be effected with the use of control system 11230 which can alternatively be used for communication between the hardware nodes 1130 and radio units 11200.

Any appropriate operations, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Example embodiments of the techniques and apparatus described herein include, but are not limited to, the following enumerated examples:

1. A method for a user equipment (UE), operating in a serving cell in a radio access network (RAN), to perform measurements on a plurality of target cells in the RAN, the method comprising:
  receiving a measurement configuration relating to a first radio-resource operation involving the plurality of target cells, the measurement configuration comprising:
    a first set of conditions relating to a first target cell of the plurality of target cells; and
    a second set of conditions relating to a second target cell of the plurality of target cells;
  performing measurements of radio signals associated with the first target cell and the second target cell;
  performing the first radio-resource operation with respect to the first target cell, based on a first determination that the measurements of the radio signals associated with the first target cell fulfill at least one condition of the first set; and
  performing the first radio-resource operation with respect to the second target cell, based on a second determination that the measurements of the radio signals associated with the second target cell fulfill at least one condition of the second set.

2. The method of embodiment 1, wherein the radio-resource operation comprises at least one of measurement reporting, handover, and cell or beam reselection.

3. The method of any of embodiments 1-2, wherein:
  the measurement configuration relates to a plurality of radio-resource operations involving the plurality of cells;
  the first set of conditions comprises a plurality of first subsets;
  the second set of conditions comprises a plurality of second subsets; and
  each of the plurality of radio-resource operations is associated with a particular one of the first subsets and a particular one of the second subsets.

4. The method of any of embodiments 1-3, wherein:
  the radio signals from the first target cell are received in a licensed band; and
  the radio signals from the second target cell are received in an unlicensed band.

5. The method of any of embodiments 1-4, wherein the second set of conditions comprises at least one condition that does not comprise the first set of conditions.

6. The method of any of embodiments 1-5, wherein the radio resource operation comprises a conditional handover.

7. The method of any of embodiments 1-6, further comprising performing the first radio-resource operation with respect to the first target cell if the one or more measurements fulfill all conditions of the first set.

8. The method of any of embodiment 1-7, wherein the first radio-resource operation is prioritized for the first target cell compared to the second target cell, based on the first determination being performed before the second determination.

9. The method of any of embodiments 1-8, wherein at least one of the first set of conditions and the second set of conditions comprises a congestion metric and a congestion threshold.

10. The method of embodiment 9, wherein the congestion metric comprises one of:
  a received signal strength indication (RSSI);
  a ratio of a number of unsuccessful detections of a mobility reference signal (MRS) to a total number of MRS detection attempts within a previous time period; and
  a ratio of a number of unsuccessful listen-before-talk (LBT) attempts to a total number of LBT attempts within the previous time period.

11. The method of any of embodiments 1-10, where at least one of the first set of conditions and the second set of conditions comprises:
  a congestion metric and a congestion threshold; and
  a quality metric and a quality threshold.

12. A method for configuring a user equipment (UE), operating in a serving cell in a radio access network (RAN), to perform measurements on a plurality of target cells in the RAN, the method comprising:
  sending, to the UE, a measurement configuration relating to a first radio-resource operation involving the plurality of target cells, the measurement configuration comprising:
    a first set of conditions relating to a first target cell of the plurality of targets cells; and
    a second set of conditions relating to a second target cell of the plurality of target cells;
  receiving a message from the UE with respect to the first radio-resource operation, the message based on one of:
    a first determination that measurements of radio signals associated with the first target cell fulfill at least one condition of the first set; and
    a second determination that measurements of radio signals associated with the second target cell fulfill at least one condition of the second set.

13. The method of embodiment 12, wherein the radio-resource operation comprises at least one of measurement reporting, handover, and cell or beam reselection.

14. The method of any of embodiments 12-13, wherein:
  the measurement configuration relates to a plurality of radio-resource operations involving the plurality of cells;
  the first set of conditions comprises a plurality of first subsets;
  the second set of conditions comprises a plurality of second subsets; and
  each of the plurality of radio-resource operations is associated with a particular one of the first subsets and a particular one of the second subsets.

15. The method of any of embodiments 12-14, wherein:
  the first target cell operates in a licensed band; and
  the second target cell operates in an unlicensed band.

16. The method of any of embodiments 12-15, wherein the second set of conditions comprises at least one condition that does not comprise the first set of conditions.

17. The method of any of embodiments 12-16, wherein the radio resource operation comprises a conditional handover.

18. The method of any of embodiments 12-17, wherein at least one of the first set of conditions and the second set of conditions comprises a congestion metric and a congestion threshold.

19. The method of embodiment 18, wherein the congestion metric comprises one of:
   a received signal strength indication (RSSI);
   a ratio of a number of unsuccessful detections of a mobility reference signal (MRS) to a total number of MRS detection attempts within a previous time period; and
   a ratio of a number of unsuccessful listen-before-talk (LBT) attempts to a total number of LBT attempts within the previous time period.

20. The method of any of embodiments 12-19, where at least one of the first set of conditions and the second set of conditions comprises:
   a congestion metric and a congestion threshold; and
   a quality metric and a quality threshold.

21. A User Equipment (UE) operable for reestablishing a connection in radio access network (RAN), the UE comprising:
   an antenna configured to send and receive wireless signals;
   radio front-end circuitry operably coupled to the antenna;
   processing circuitry operably coupled to the radio front-end circuitry and configured to perform any of the operations of any of embodiments 1-11;
   an input interface connected to the processing circuitry and configured to allow input of information to be processed by the processing circuitry;
   an output interface connected to the processing circuitry and configured to output information that has been processed by the processing circuitry; and
   a battery connected to the processing circuitry and configured to supply power to the UE.

The invention claimed is:

1. A method for a user equipment (UE) operating in a serving cell in a radio access network (RAN), to perform measurements on a plurality of target cells in the RAN, the method comprising:
   receiving a measurement configuration relating to one or more radio resource operations, the measurement configuration comprising:
      a first set of conditions relating to a first target cell of the target cells; and
      a second set of conditions relating to a second target cell of the target cells;
   performing measurements of radio signals associated with at least one of the first target cell and the second target cell, wherein
      the radio signals from the first target cell are received in a licensed band, and
      the radio signals from the second target cell are received in an unlicensed band;
   performing a radio resource operation with respect to the first target cell, based on a first determination that the measurements of the radio signals associated with the first target cell fulfill at least one condition of the first set; and
   performing the radio resource operation with respect to the second target cell, based on a second determination that the measurements of the radio signals associated with the second target cell fulfill at least one condition of the second set,
      wherein the radio resource operation for the first target cell is prioritized relative to the second target cell, based on the first determination being prioritized before the second determination.

2. The method of claim 1, wherein
   the second set of conditions includes at least one condition that is not included in the first set of conditions.

3. The method of claim 1, wherein:
   the first target cell is one of a first group of cells associated with the first set of conditions;
   the second target cell is one of a second group of cells associated with the second set of conditions; and
   performing the measurements of the radio signals comprises prioritizing measurements of radio signals associated with the first group relative to measurements of radio signals associated with the second group.

4. The method of claim 1, wherein:
   the measurement configuration relates to a plurality of radio resource operations involving the plurality of cells;
   the first set of conditions comprises a plurality of first subsets of conditions; and
   each of the plurality of radio resource operations is associated with one of the first subsets.

5. The method of claim 4, wherein performing the radio resource operation with respect to the first target cell comprises:
   performing a first radio resource operation based on a first determination that the measurements of the radio signals associated with the first target cell fulfill at least one condition of a particular first subset; and
   performing a second radio resource operation based on a first determination that the measurements of the radio signals associated with the first target cell fulfill at least one condition of a further first subset.

6. The method of claim 4, wherein:
   the second set of conditions comprises a plurality of second subsets of conditions; and
   each of the plurality of radio resource operations is further associated with one of the second subsets.

7. The method of claim 1, wherein performing the radio resource operation with respect to the first target cell further comprises performing the radio resource operation with respect to the first target cell if the one or more measurements fulfill all conditions of the first set.

8. The method of claim 1, wherein:
   at least one of the first set of conditions and the second set of conditions comprises a congestion threshold; and
   performing the measurements of the radio signals further comprises determining, based on the measurement results, respective congestion metrics associated with the at least one of the first target cell and the second target cell.

9. The method of claim 8, wherein the respective congestion metrics are determined based on one or more of the following:
   a ratio of a number of unsuccessful detections of a mobility reference signal (MRS) to a total number of MRS detection attempts during a previous time period;
   a ratio of a number of unsuccessful listen-before-talk (LBT) attempts to a total number of LBT attempts;
   an average contention window size during the total number of LBT attempts; and
   an average running duration of a backoff timer during the total number of LBT attempts.

10. The method of claim 1, wherein:
   at least one of the first set of conditions and the second set of conditions comprises a quality threshold; and
   performing the measurements of the radio signals further comprises determining, based on the measurement results, respective quality metrics associated with the at least one of the first target cell and the second target cell.

11. A method for configuring a user equipment (UE) operating in a serving cell in a radio access network (RAN) to perform measurements on a plurality of target cells in the RAN, the method comprising:
sending, to the UE, a measurement configuration relating to one or more radio resource operations, the measurement configuration comprising:
a first set of conditions relating to a first target cell of the target cells, and
a second set of conditions relating to a second target cell of the target cells, wherein
the radio signals from the first target cell are received in a licensed band, and
the radio signals from the second target cell are received in an unlicensed band; and
receiving a message from the UE with respect to one of the radio resource operations, wherein the message is based on one of the following:
a first determination that measurements of radio signals associated with the first target cell fulfill at least one condition of the first set; and
a second determination that measurements of radio signals associated with the second target cell fulfill at least one condition of the second set,
wherein a radio resource operation for the first target cell performed based on the first determination is prioritized relative to a radio resource operation of the second target cell performed based on the second determination, and the first determination is prioritized before the second determination.

12. The method of claim 11, wherein the second set of conditions includes at least one condition that is not included in the first set of conditions.

13. The method of claim 11, wherein:
the first target cell is one of a first group of cells associated with the first set of conditions;
the second target cell is one of a second group of cells associated with the second set of conditions; and
measurements of radio signals associated with the first group are prioritized relative to measurements of radio signals associated with the second group.

14. The method of claim 11, wherein:
the measurement configuration relates to a plurality of radio resource operations involving the plurality of cells;
the first set of conditions comprises a plurality of first subsets of conditions;
the second set of conditions comprises a plurality of second subsets of conditions; and
each of the plurality of radio resource operations is associated with one of the first subsets and one of the second subsets.

15. The method of claim 11, wherein:
at least one of the first set of conditions and the second set of conditions comprises a congestion threshold; and
the first determination that the measurements of the radio signals associated with the first target cell fulfill at least one condition of the first set comprises a comparison between a congestion metric associated with the first target cell and the congestion threshold.

16. The method of claim 15, wherein the congestion metric is based on one or more of the following:
a ratio of a number of unsuccessful detections of a mobility reference signal, MRS, to a total number of MRS detection attempts during a previous time period;
a ratio of a number of unsuccessful listen-before-talk (LBT) attempts to a total number of LBT attempts;
an average contention window size during the total number of LBT attempts; and
an average running duration of a backoff timer during the total number of LBT attempts.

17. The method of claim 11, wherein:
at least one of the first set of conditions and the second set of conditions comprises a quality threshold; and
the first determination that the measurements of the radio signals associated with the first target cell fulfill at least one condition of the first set comprises a comparison between a quality metric associated with the first target cell and the quality threshold.

18. A user equipment (UE) configured to operate in a serving cell and to perform measurements on a plurality of target cells in a radio access network (RAN), the UE comprising:
transceiver circuitry operably configured to communicate with the RAN; and
processing circuitry operatively coupled with the transceiver circuitry, whereby the processing circuitry and the transceiver circuitry are configured to:
receive a measurement configuration relating to one or more radio resource operations, the measurement configuration comprising:
a first set of conditions relating to a first target cell of the target cells; and
a second set of conditions relating to a second target cell of the target cells;
perform measurements of radio signals associated with at least one of the first target cell and the second target cell, wherein
the radio signals from the first target cell are received in a licensed band, and
the radio signals from the second target cell are received in an unlicensed band;
perform a radio resource operation with respect to the first target cell, based on a first determination that the measurements of the radio signals associated with the first target cell fulfill at least one condition of the first set; and
perform the radio resource operation with respect to the second target cell, based on a second determination that the measurements of the radio signals associated with the second target cell fulfill at least one condition of the second set,
wherein the radio resource operation for the first target cell is prioritized relative to the second target cell, based on the first determination being prioritized before the second determination.

19. A network node of a radio access network (RAN), the network node comprising:
processing circuitry configured to perform operations corresponding to the method of claim 11;
transceiver circuitry operably coupled with the processing circuitry and configured to communicate with one or more user equipment (UEs); and
power supply circuitry configured to supply power to the network node.

* * * * *